(12) United States Patent
Chung et al.

(10) Patent No.: US 7,383,426 B2
(45) Date of Patent: Jun. 3, 2008

(54) PROCESSOR EMPLOYING LOADABLE CONFIGURATION PARAMETERS TO REDUCE OR ELIMINATE SETUP AND PIPELINE DELAYS IN A PIPELINE SYSTEM

(75) Inventors: Chris Y. Chung, Houston, TX (US); Ravi A. Managuli, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 542 days.

(21) Appl. No.: 10/459,016

(22) Filed: Jun. 11, 2003

(65) Prior Publication Data

US 2004/0255105 A1 Dec. 16, 2004

(51) Int. Cl.
*G06F 7/38* (2006.01)
*G06F 9/00* (2006.01)
*G06F 9/44* (2006.01)
*G06F 15/00* (2006.01)

(52) U.S. Cl. .................................................. 712/220
(58) Field of Classification Search ............... 712/220, 712/229
See application file for complete search history.

(56) References Cited

U.S. PATENT DOCUMENTS

| 5,805,875 | A | * | 9/1998 | Asanovic ..................... 712/222 |
| 6,487,653 | B1 | * | 11/2002 | Oberman et al. ........... 712/222 |
| 6,959,378 | B2 | * | 10/2005 | Nickolls et al. ............ 712/229 |

* cited by examiner

*Primary Examiner*—Richard L. Ellis
*Assistant Examiner*—Brian P Johnson
(74) *Attorney, Agent, or Firm*—Ronald M. Anderson

(57) ABSTRACT

A deep-pipeline system substantially reduces the overhead of setup delays and pipeline delays by dynamically controlling access of a plurality of configuration register sets by both a host central processing unit (CPU) and the stages of the pipelines. A master configuration register set is loaded with configuration parameters by the host CPU in response to an index count provided by a setup-index counter. A plurality of other counters are employed to track timing events in the system. In one embodiment, a run-index counter provides a run-index count to the first stage of the pipeline that is propagated along the stages, enabling configuration register sets to transfer configuration parameters to the stages of the pipeline when required to enable processing of a task. In an alternative embodiment, a plurality of D flip-flops sequentially propagates a state for successive registers, so that the setup-index counter is not required.

11 Claims, 17 Drawing Sheets

X, Y, Z: TASKS
$T_S$: SETUP DELAY
$T_R$: PIPELINE RUN TIME
$T_A$: PIPELINE ACTIVE TIME
$T_P$: PIPELINE DELAY $T_S$ : SETUP DELAY
$T_R$ : PIPELINE RUN TIME
$T_A$ : PIPELINE ACTIVE TIME
$T_P$ : PIPELINE DELAY

| RECTANGLE SIZE | NUMBER OF RECTANGLES | TOTAL CYCLES | | | | | |
|---|---|---|---|---|---|---|---|
| | | ONE PIPELINE | | | EIGHT PIPELINES | | |
| | | WITHOUT PIPELINE DELAY | WITH PIPELINE DELAY | PERCENT OVERHEAD | WITHOUT PIPELINE DELAY | WITH PIPELINE DELAY | PERCENT OVERHEAD |
| 256 X 256 | 1 | 65,636 (100 + 65,536) | 65,636 | 0.0 | 8,292 (100 + 8,192) | 8,292 | 0.0 |
| 128 X 128 | 4 | | 65,936 | 0.5 | | 8,592 | 3.6 |
| 64 X 64 | 16 | | 67,136 | 2.3 | | 9,792 | 18.1 |
| 32 X 32 | 64 | | 71,936 | 9.6 | | 14,592 | 76.0 |
| 16 X 16 | 256 | | 91,136 | 38.9 | | 33,792 | 307.5 |
| 8 X 8 | 1024 | | 167,936 | 155.9 | | 110,592 | 1,233.7 |

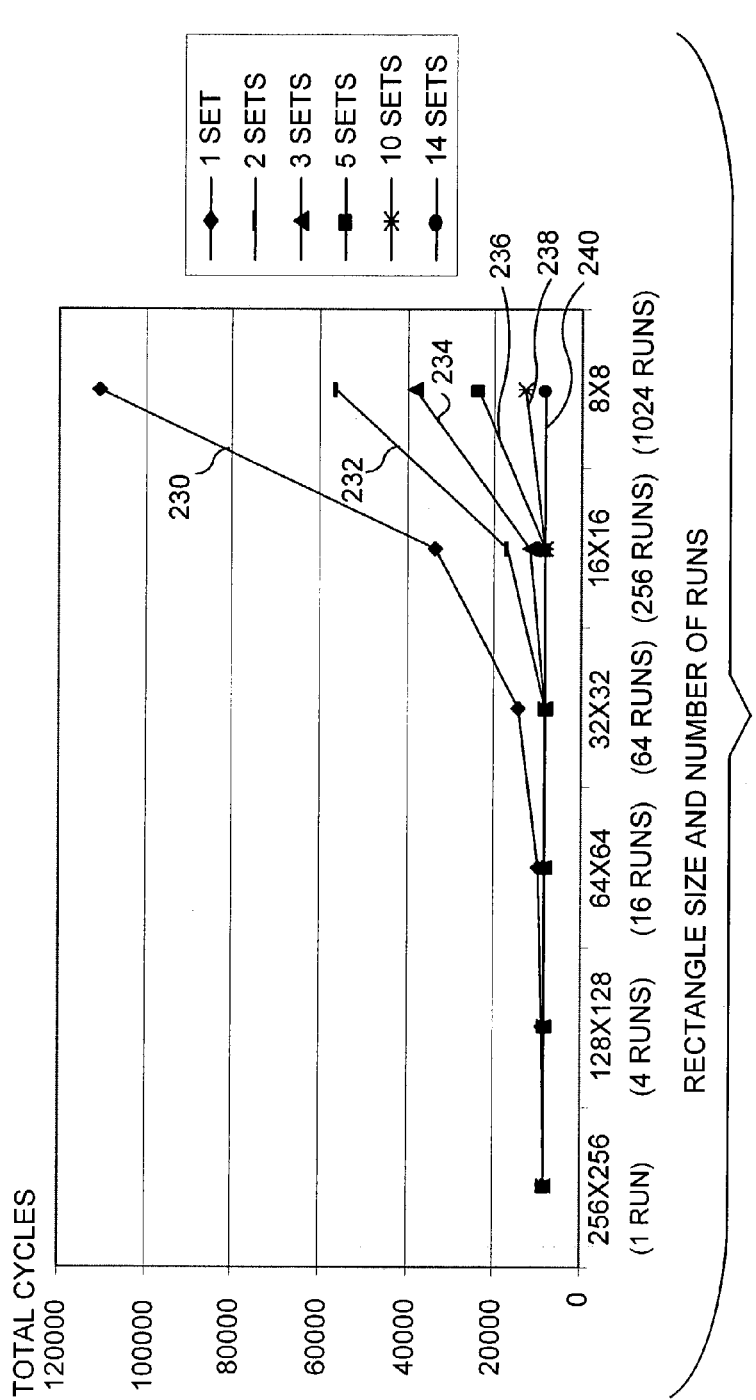
FIG. 21
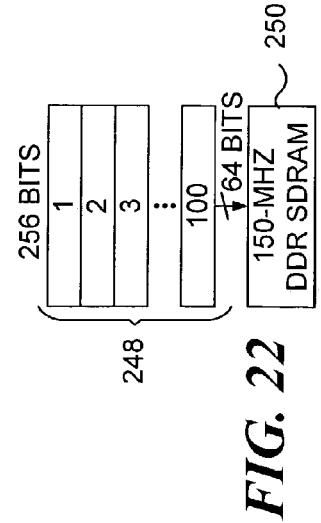
FIG. 22
| TEXTURE FILTERING | PEAK THROUGHPUT (PIXELS/CYCLE) |
|---|---|
| NO FILTERING | 8 |
| BILINEAR FILTERING | 2 |
| TRILINEAR FILTERING | 1 |
FIG. 23

PROCESSOR EMPLOYING LOADABLE CONFIGURATION PARAMETERS TO REDUCE OR ELIMINATE SETUP AND PIPELINE DELAYS IN A PIPELINE SYSTEM

FIELD OF THE INVENTION

The present invention is generally directed to a deep-pipeline system that controls access to sets of configuration registers by a host and stages of the pipeline, and more specifically, pertains to dynamically controlling transferring configuration parameters into configuration register sets from the host and dynamically controlling the access of the configuration register sets by the stages of the pipeline, in response to control signals that indicate a current status of the system, thereby enabling the processing of tasks by the pipeline to proceed without being affected by the overhead of setup and pipeline delays.

BACKGROUND OF THE INVENTION

Deep-pipelined architectures are widely employed in application specific integrated circuits (ASICs) and graphics processors. Pipelining is an implementation technique that divides tasks such as rendering a graphic object or implementing wavelet transforms into smaller subtasks that are allocated to a plurality of sequential units or stages. Its goal is to achieve a relatively high throughput by making full use of the processing capabilities of a device. In microprocessors, this technique is sometimes used to accelerate individual units, such as functional units and caches, and in ASICs and graphics processors, deep-pipelining is frequently used to handle high-level graphic tasks.

As shown in FIG. 1, a deep-pipelined architecture typically includes configuration registers 22 that are used to store configuration parameters employed in processing tasks. The configuration parameters are supplied to the configuration registers under the control of a host central processing unit (CPU) 24, to enable processing of the tasks by N pipeline stages 26a, 26b, 26c, . . . 26n. The configuration registers are connected to the pipeline stages, and for every processing cycle, the output of each pipeline stage is passed to the next stage in the sequence. For each task, host CPU 24 sets up the required parameters in configuration registers 22 and then issues a "run" command to the pipeline. As used herein, the term "run" refers to a coordinated action applied to execute a task using the stages in a pipeline. Since in the configuration shown in FIG. 1, host CPU 24 needs to wait for the pipeline to complete the current run before initiating the next run, the time for each run includes the time for a setup and the time for execution of the tasks comprising the run in the pipeline. While the time for completing a setup (which is referred to herein as the "setup time" or "setup delay") depends on the number of configuration registers that must be setup, the time for a pipeline execution of a task (i.e., the pipeline run time) depends on the complexity of the task being executed by the pipeline, e.g., the size of each triangle being rendered in a graphics pipeline.

FIG. 2A illustrates the times involved in executing tasks when one set of configuration registers is used in a pipeline. In this simple example, it is assumed that there are only three tasks (x, y, and z). For each task, the host CPU sets up the configuration registers and waits for the pipeline to finish the task. Therefore, a new task can be issued after each time interval that corresponds to the sum $T_S+T_R$, where $T_S$ is the setup delay and $T_R$ is the pipeline run time. The pipeline run time for each stage includes a pipeline active time ($T_A$), when a task is being executed by the stage, and a pipeline delay ($T_P$). A pipeline stage is active during $T_A$, whereas it is idle during $T_P$, waiting for the output of another stage to be completed. Thus, in deep-pipelined architectures, the setup delay and the pipeline delay together affect the overall pipeline utilization efficiency. FIGS. 2B and 2C illustrate known techniques that are used to reduce these undesired delays.

FIG. 2B shows the timing relationships where two sets of configuration registers are used to reduce the setup delay. In this case, the host CPU prepares a set of registers for the next run (e.g., prepares configuration register set 2 to run task Y), while the pipeline processes the current run (e.g., task X) with another set of registers (e.g., register set 1), thus eliminating the setup delay, except for the first run. The total reduced time, which is indicated by the symbol ① in FIG. 2B, is equal to $(N_R-1) \times T_S$, where $N_R$ is the number of runs and $T_S$ is the setup delay. An exemplary pipeline system 40 like those used in the prior art to reduce the setup delay is shown in FIG. 3A. Two sets of configuration registers (i.e., a master configuration register set 42 and a slave configuration register set 44) are sequentially connected. Host CPU 24 prepares the master configuration register set for the next run, while the pipeline works with the slave configuration register set. The configuration parameters in the master configuration register set are transferred to the slave set before each run, where they are available to the stages.

Two configuration register sets are sometimes used differently in the prior art to reduce the pipeline delay, instead of the setup delay, as shown in the timing diagram of FIG. 2C. In this case, as illustrated in a pipeline system 50 in FIG. 3B, host CPU 24 initially prepares a first configuration register set 54 and a second configuration register set 56 with parameters that are supplied through a 1:2 demultiplexer (DEMUX) 52 (or other switching configuration that carries out the equivalent function), and then initiates a run that uses the parameters in the first configuration register set. Once the first pipeline stage 26a (Stage 1) finishes the first run, the host CPU initiates the second run using the parameters in the second configuration register set 56. As will be apparent in FIG. 2C, other pipeline stages are still processing the first run with the parameters in the first configuration register set (e.g., stage N is still processing task X using the parameters in configuration register set 1) when the first pipeline stage starts the second run (e.g., processing task Y) with the parameters of the second configuration register set, so that the two runs overlap in time. In this example, a pipeline delay can be eliminated every two runs, as indicated by the time interval identified using the symbol ② in FIG. 2C.

The exemplary configuration shown in FIG. 3B employs two sets of configuration registers that are connected in parallel. The host CPU sets up both configuration register sets, as indicated by the symbol ① in FIG. 3B, and then sends an index value (1 to 2) to the first pipeline stage, as indicated by the symbol ② in FIG. 3B. This index value (shown as A) is passed to the next stage of the pipeline along with the output of the previous stage (shown as B), and the index value is employed to select a proper configuration register set for each of stages 26a, 26b, 26c, . . . 26n via 2:1 multiplexer (MUX) array stages 58a, 58b, 58c, . . . 58n (or using other techniques that achieve the same function).

Even though pipeline system 50 can reduce the pipeline delay to some extent and can be extended to multiple register sets (e.g., to M configuration register sets), a pipeline delay still exists every M runs, in addition to the setup delay. This technique could be rather useful in the case where multiple sets of configuration parameters are required for a higher-level task and most parameters can be reused in subsequent higher-level tasks, e.g., multi-pass rendering in a graphics pipeline where several runs are required to map multiple textures to a triangle. However, the prior art enables either setup delays or pipeline delays to be substantially reduced, but not both. Clearly, it would be desirable to substantially reduce or eliminate the overhead of both setup and pipeline delays in consecutive pipeline runs, thus increasing the overall pipeline utilization.

SUMMARY OF THE INVENTION

The present invention has been developed to address the problems noted above. One aspect of this invention is directed to a pipeline system that includes a host used to control the processing of tasks and to supply configuration parameters employed in processing the tasks by the pipeline. This pipeline system also includes a plurality of configuration register sets in which configuration parameters are selectively loaded by the host. A plurality of stages use the configuration parameters from the configuration register sets to execute the tasks. Also provided are a plurality of control signal sources that track timing events in the pipeline system, producing a plurality of signals that dynamically control access to the plurality of configuration register sets by both the host and the plurality of stages. The configuration registers are setup by the host without delaying processing of the tasks. In addition, the processing of the tasks overlap within the plurality of stages, resulting in a substantial reduction of both a setup delay and a pipeline delay in the pipeline system, as the tasks are processed.

A master configuration register set is preferably disposed between the host and the plurality of configuration register sets. The host loads configuration parameters into the master configuration register set for transfer into a selected one of the plurality of configuration register sets in response to a control signal from the plurality of control signal sources.

The plurality of control signal sources includes a setup-ready control signal source that tracks an increment signal from the host and a decrement signal from the plurality of stages to determine when to produce a "full" control signal. The full control signal is supplied to the host to indicate that the plurality of configuration register sets have been loaded with the configuration parameters.

A setup-use control signal source tracks an increment signal from the host and a decrement signal from the plurality of stages to determine when to produce a "non-empty" control signal. This non-empty control signal is supplied to the plurality of stages to indicate that a configuration register set is ready for a run.

A setup-index control signal source tracks an increment signal from the host to produce an index control signal that indicates a specific configuration register set to receive the configuration parameters from the host. The index control signal rolls over, after indicating a last of the plurality of configuration registers sets, and upon receiving another increment signal, then indicates a first of the configuration register sets to receive the configuration parameters from the host.

A run-index control signal source tracks an increment signal from the plurality of stages to produce a run-index control signal that indicates a specific configuration register set to provide the configuration parameters to one of the plurality of stages. The run-index control signal also rolls over after indicating a last of the plurality of configuration registers sets, upon receiving another increment signal, and then indicates a first of the configuration register sets to provide the configuration parameters.

Another aspect of the present invention is directed to a method for substantially reducing both a setup time and a pipeline delay time for processing tasks in a deep-pipelined architecture. The method includes steps that are generally consistent with the functions of the components of the pipeline system described above. Still another aspect of the present invention is directed to a memory medium that stores machine instructions for carrying out the steps of the method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 (Prior Art) is a block diagram illustrating an exemplary deep-pipelined architecture;

FIGS. 2A, 2B, and 2C (Prior Art) are three timing diagrams respectively illustrating delays and timing for executing tasks with a pipeline when one set of configuration registers is used, two sets are used to reduce the setup delay, and two sets are used to reduce the pipeline delay;

FIGS. 3A and 3B (Prior Art) are schematic block diagrams of pipeline systems used to reduce setup delay and pipeline delay, respectively;

FIGS. 4A (Prior Art), and 4B are timing diagrams showing how the present invention substantially eliminates both setup and pipeline delays (when the active time is greater than or equal to the pipeline delay), for the case where all stages use the same configuration register set, and the case where the configuration registers are dynamically assigned to the host and the pipeline, respectively;

FIGS. 5A (Prior Art), 5B, and 5C are timing diagrams showing how the present invention substantially eliminates both setup and pipeline delays (where the active time is less than the pipeline delay), for the case where all stages refer to the same configuration register set, all stages refer to two sets of configuration registers, and all stages refer to multiple sets of configuration registers, respectively;

FIG. 21 is a chart of total cycles versus rectangle size and number of runs for different numbers of configuration register sets;

FIG. 22 is a schematic view of an exemplary graphics pipeline running at 300 MHz, with a 64-bit, 150 MHz double data rate synchronous dynamic random access memory (DDR SDRAM);

FIG. 23 is a table showing the peak throughput of the exemplary graphics pipeline of FIG. 22, for various filtering methods;

DESCRIPTION OF THE PREFERRED EMBODIMENTS

As noted above in the Background of the Invention, a significant overhead caused by the pipeline delay can arise in a pipeline when all pipeline stages refer to the same set of configuration registers throughout an entire run and when waiting for processing of a task to be completed in another stage. In consideration of these problems, the present invention allows both setup and pipeline delays to be substantially reduced by dynamically controlling access by the pipeline stages to the configuration registers sets, and by dynamically loading the registers sets with the host. Thus, the host is enabled to load configuration parameters for access by the configuration registers sets when needed and the pipeline stages are able to access the configuration registers sets to carry out the processing of tasks in a very efficient manner.

In the exemplary preferred embodiments, the host is disclosed as a host processor or host CPU. However, it is clearly contemplated that the host may be any type of controller and is not limited to a processor or CPU. For example, the host may be another pipeline. Accordingly, the claims that define the present invention make use of the more general term "host," with the intent that this term will encompass the broader concept of any type of controller and not be limited to a CPU or other type of processor.

The disclosure of the present invention is divided into two parts. In the first part, it is assumed that the pipeline active time is greater than or equal to the pipeline delay ($T_A \geq T_P$). In the second case, the pipeline active time is less than the pipeline delay ($T_A < T_P$). In both cases, it is assumed that the setup time is less than both the pipeline active time and the pipeline delay.

Case 1: Pipeline Active Time is Greater Than or Equal to the Pipeline Delay

Figure 1:
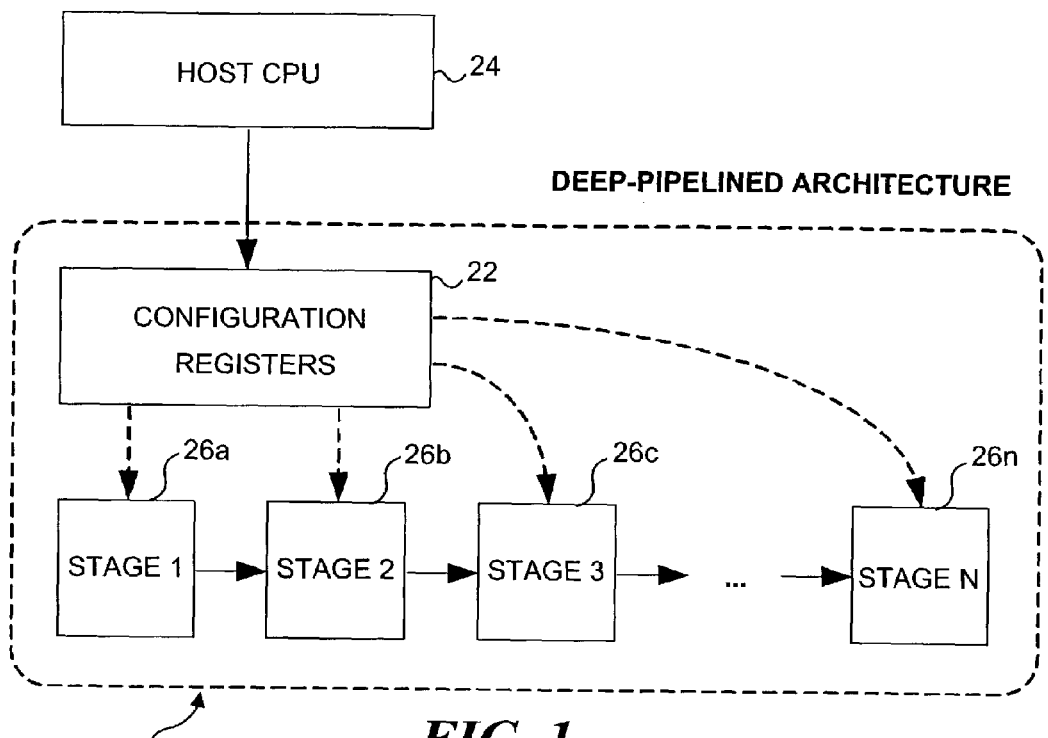
Figure 2A:
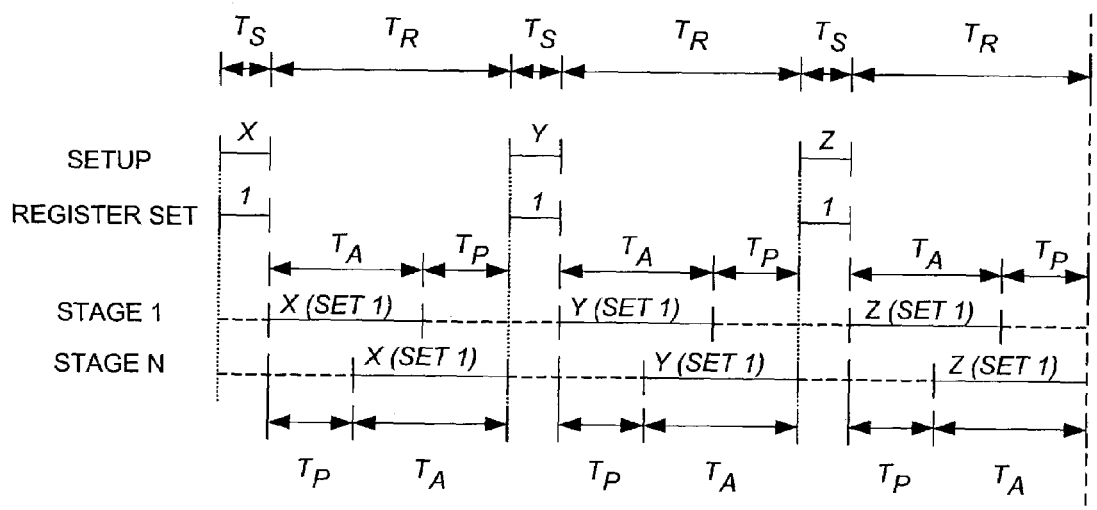
Figure 2B:
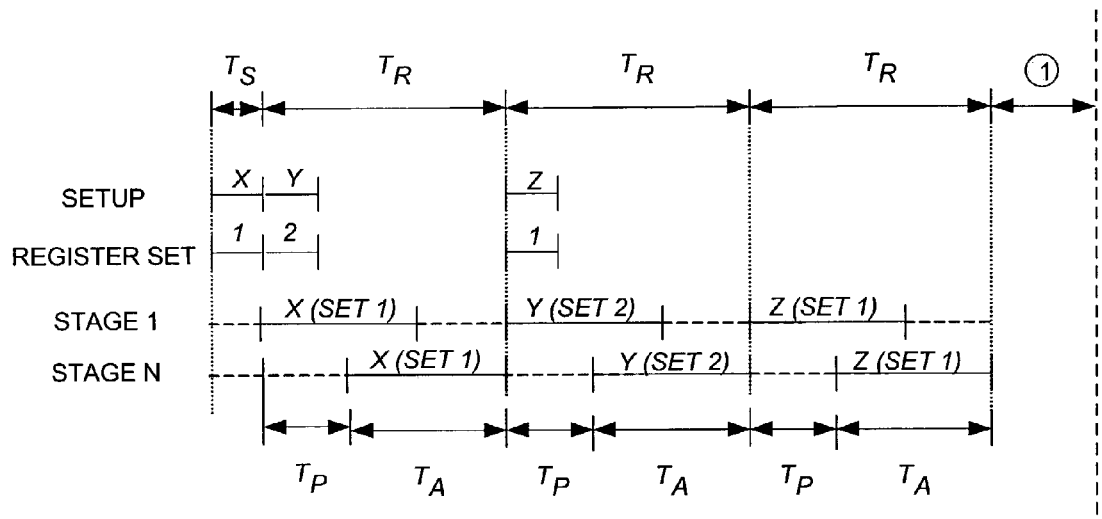
Figure 2C:
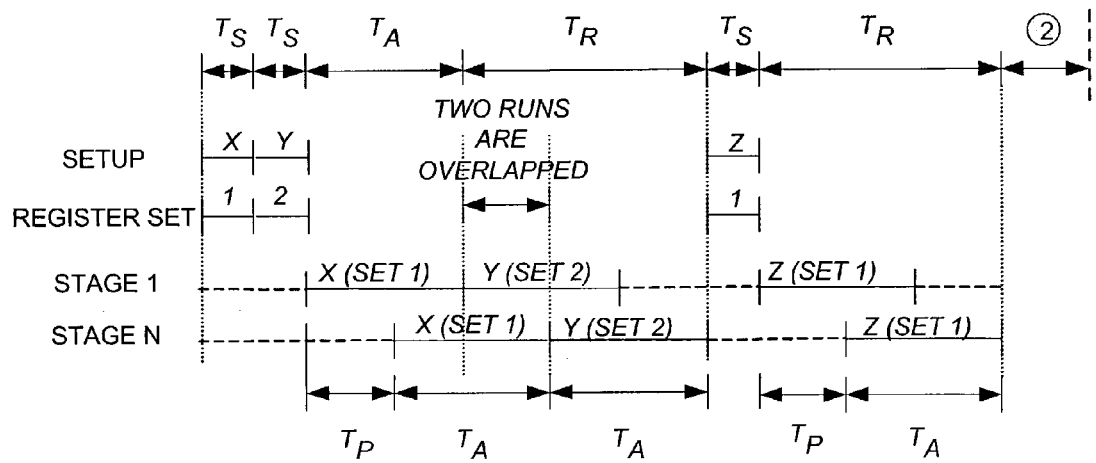
Figure 3A:
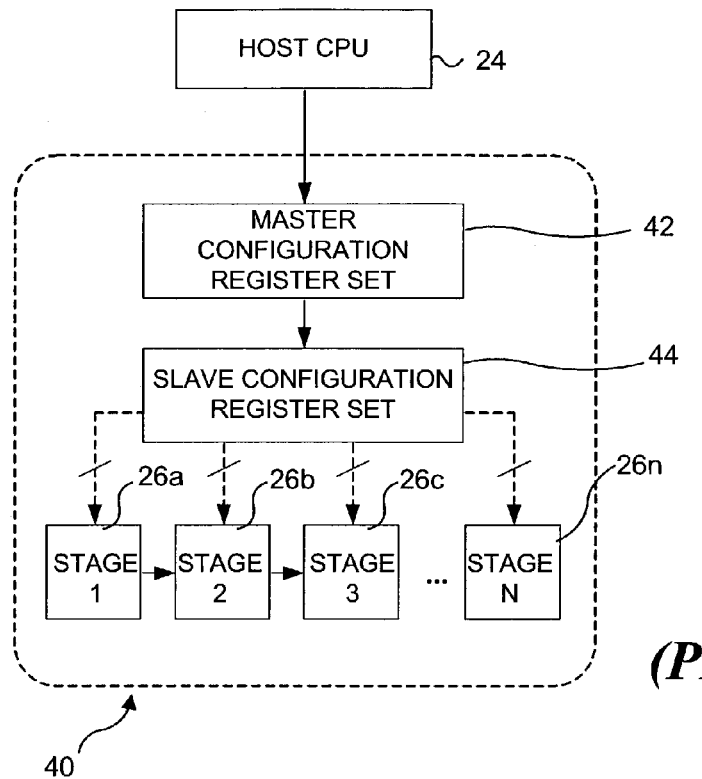
Figure 3B:
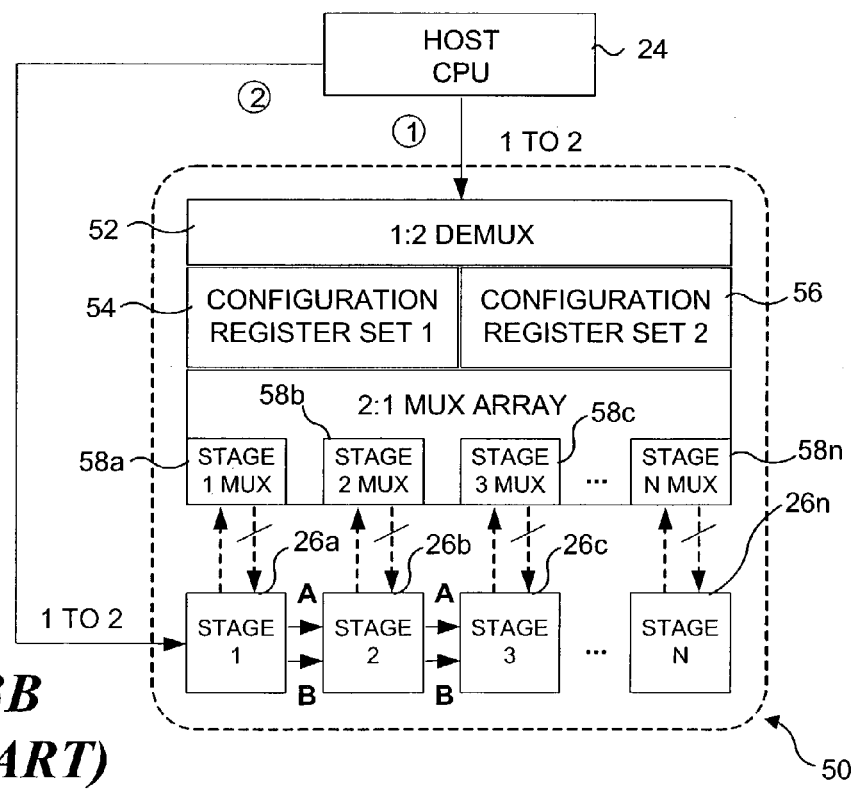
Figure 4A:
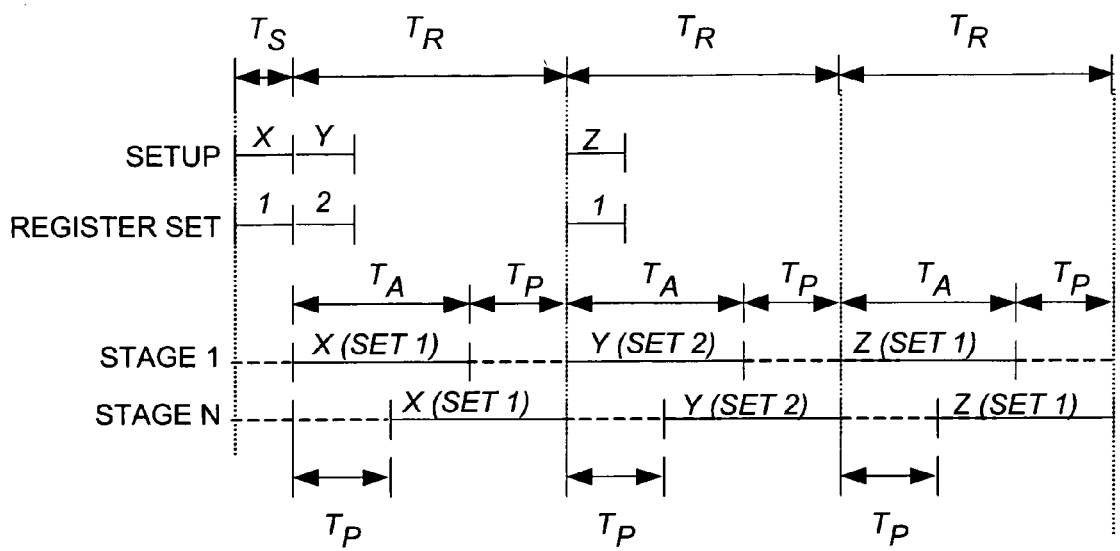

In the timing example shown in FIG. 4A, which again illustrates the problems of the prior art that were discussed above in regard to FIG. 2B, two sets of configuration registers are used to reduce the overhead of the setup delay. In this example, configuration register set 1 is loaded with the configuration parameters for a Task X during an initial setup time $T_S$, and while Task X is processed using the configuration parameters in configuration register set 1, configuration register set 2 is loaded with the configuration parameters for a Task Y. Following a pipeline delay, $T_P$, configuration register set 1 is loaded with the configuration parameters for Task Z while Task Y is active using the configuration parameters from configuration register set 2. In this example, two consecutive runs do not overlap, because all pipeline stages 1 through N use the same configuration register set.

To improve the performance of this pipeline, it is necessary to reduce the pipeline delay, which is done in the present invention by allowing each pipeline stage to access selected register sets based on an index value that is passed from the previous stage, and by continuously dynamically allocating different register sets to the host CPU and to the pipeline. In this way, consecutive runs can be overlapped as shown in FIG. 4B.

Figure 4B:
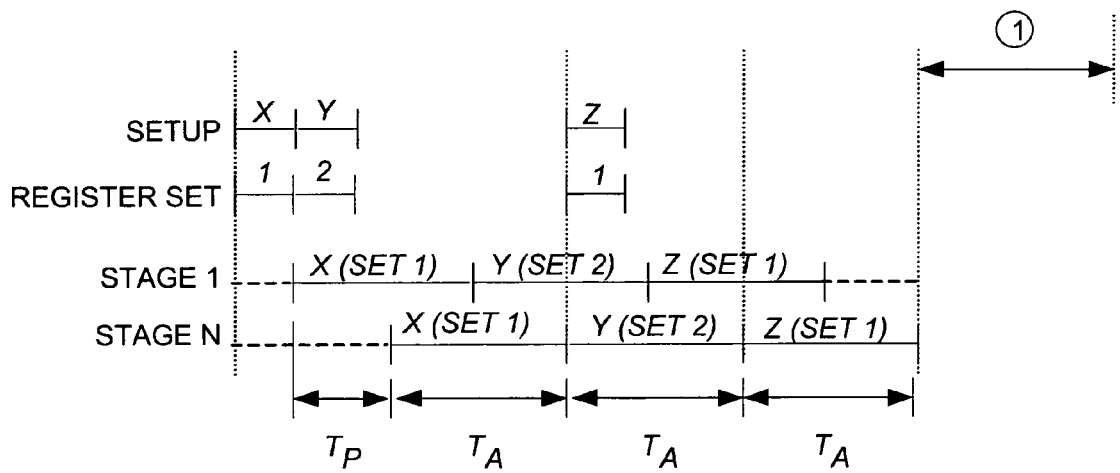

By inspecting FIG. 4B, it will be apparent that the pipeline delay has been eliminated between Tasks X, Y, and Z in each stage. The total reduced time, which is represented by ① in FIG. 4B, is equal to $(N_R-1) \times T_P$. In this example, two sets of configuration registers are sufficient to eliminate both setup delay occurring between Tasks X ans Y, and between Tasks Y and Z, and pipeline delay occurring between Tasks X, Y, and Z, since the pipeline delay can be hidden behind the pipeline active time, $T_A$.

Case 2: The Active Time is Less Than the Pipeline Delay Time

Figure 5A:
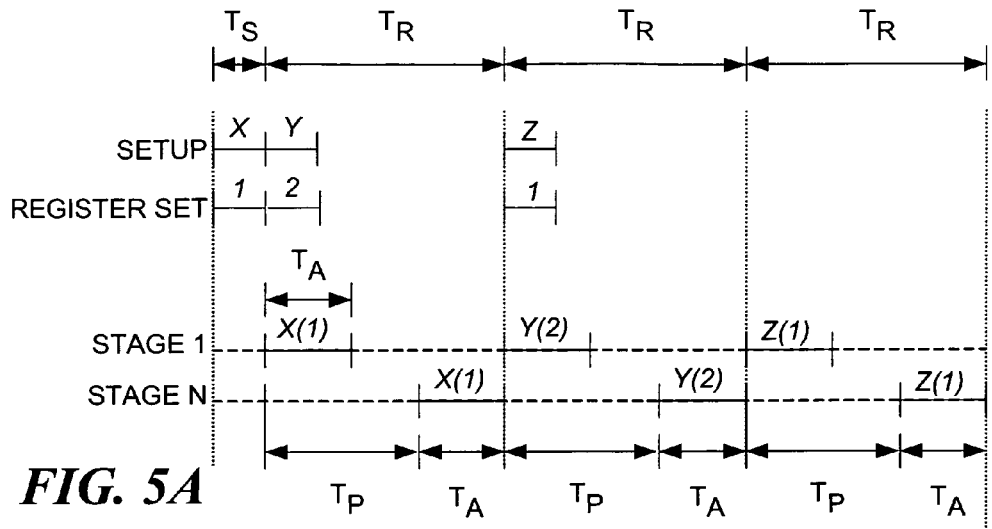

Even though two configuration registers sets are used and are dynamically assigned, an idle time can exist if the active time is less than the pipeline delay (($T_A < T_P$). FIG. 5A illustrates the timing relationships of the prior art when all stages refer to same configuration register set, so that no run can overlap another run. As illustrated therein, in regard to Stage N, a pipeline delay exists prior to the active time for each Task X, Y, and Z.

Figure 5B:
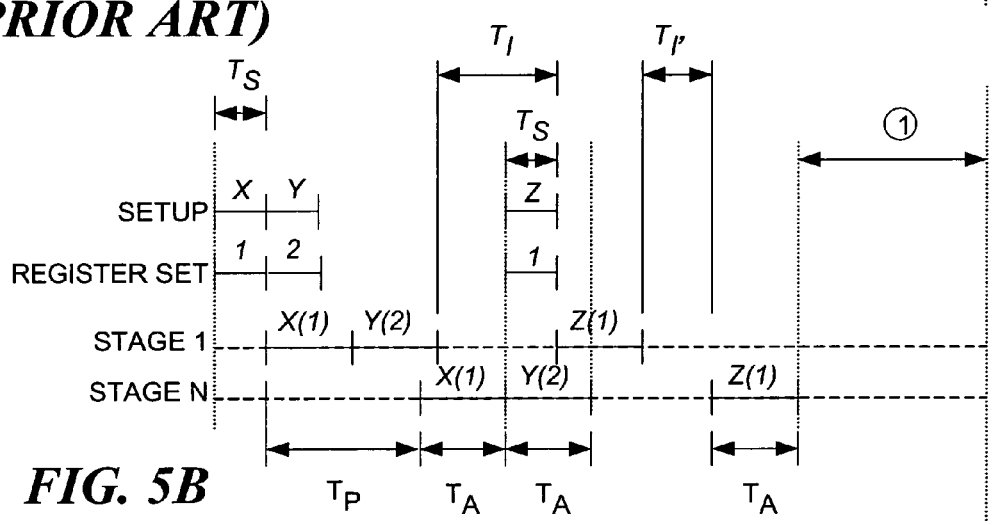
Figure 5C:
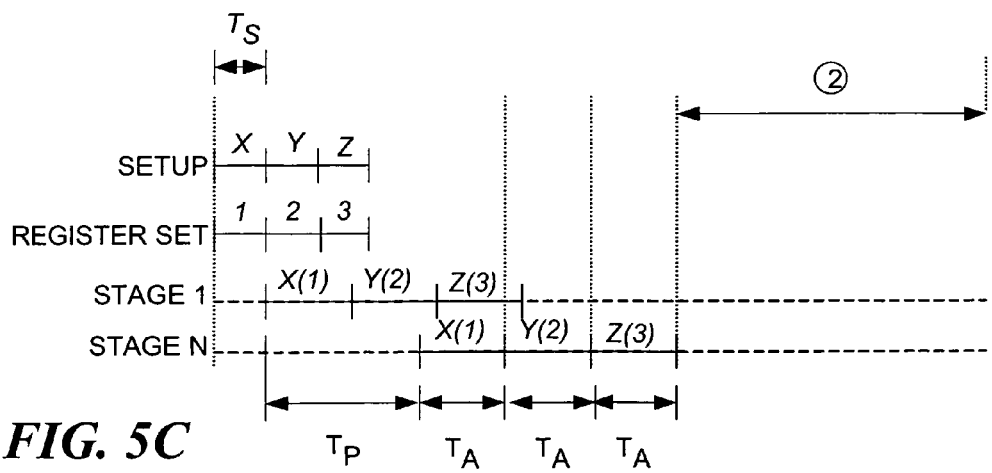

The results when two configuration registers sets are used can be substantially improved, as shown in FIG. 5B. However, an idle time still exists even when two register sets are used, because there is no configuration register set available when the first stage finishes the second run. Thus, an idle time, $T_1$, exists between the active time for processing Task Y, and the active time for processing Task Z. Part of this idle time is required for setup of configuration register set 1 with the configuration parameters required to execute Task Z and is thus a setup delay. Also, the first stage must wait until the last stage finishes its run so that the configuration register set used for the last stage is available for the first stage. The idle time between the last run in the first stage and the last run in the last stage is equal to $T_1$, in this example. Nevertheless, the dynamic use of at least two configuration register sets in FIG. 5B provides a reduced time identified by the symbol ① in FIG. 5B relative to the time required to process the tasks in FIG. 5A. This reduced time is equal to $(N_R-1) \times T_P - (N_R-2) \times T_1$, where $T_1$ equals $T_P - T_A + T_S$. to eliminate the idle time, $T_1$, as shown in FIG. 5C, a third configuration register set is employed so that the pipeline delay overhead is hidden behind multiple runs. Using this approach in the present invention, the host CPU can always prepare a register set for the first stage, without incurring the idle time $T_1$. Accordingly, by using three configuration register sets, as shown in FIG. 5C, the reduced time provided by the present invention, which is indicated by the symbol ② in FIG. 5C, becomes equal to $(N_R-1) \times T_P$. Therefore, it is apparent that a sufficient number of configuration register sets must be provided to avoid incurring the idle time $T_1$. The minimum number of configuration register sets needed to hide the pipeline delay behind multiple pipeline runs is equal to:

$$\left\lceil \frac{T_P}{T_A} \right\rceil + 1$$

where $$\left\lceil \frac{T_P}{T_A} \right\rceil$$

is equal to the smallest integer that is not less than the quotient of $T_P$ divided by $T_A$. For example, $$\left\lceil \frac{3}{2} \right\rceil$$

is equal to 2.

Exemplary Pipeline Configuration

Figure 6:
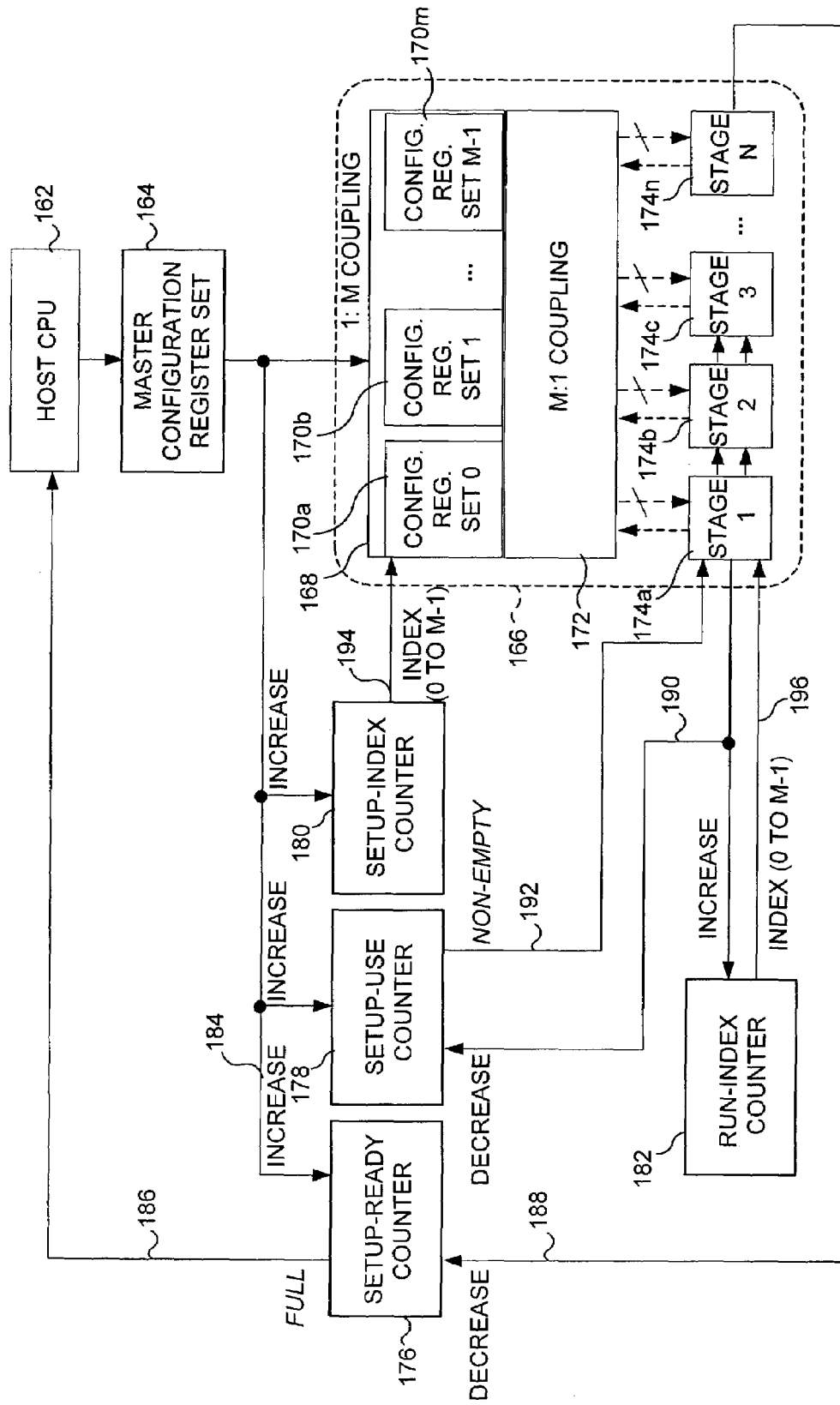
FIG. 6 is a block diagram illustrating a preferred embodiment of a deep-pipeline architecture in accord with the present invention.

FIG. 6 illustrates an exemplary pipeline system 160 in accord with the present invention, where M configuration register sets are used. As shown in this Figure, a host CPU 162 is coupled to a master configuration register set 164 to enable the host CPU to load configuration parameters into the master configuration register set so that they can be selectively used by N stages of a deep pipeline 166. A 1:M coupling 168 is provided to enable the configuration parameters that have been loaded into master configuration register set 164 to be selectively loaded into configuration register sets 170a, 170b, ... 170m, which correspond respectively to configuration register sets 1, 2, . . . M. A dynamically controlled access to the configuration register sets is provided through an M:1 coupling 172 so that stages 174a, 174b, 174c, . . . , 174n, which respectively represent stages 1, 2, 3, . . . N can selectively access the configuration register parameters in configuration register sets 170a through 170m as a function of an index value, which varies between 0 and M−1.

The present invention employs four counters (or functional equivalents of counters) for dynamically controlling access to the master configuration register set by the configuration register sets that are loaded with configuration parameters, and for dynamically controlling access by the stages to the configuration register sets, to efficiently implement a plurality of tasks. As used herein, the term "counter" is not intended to be limiting, since it will be understood that other types of accumulators or other software/hardware components can be employed to carry out an equivalent function to generate indices included in control signals for controlling the dynamic 1:M coupling in the dynamic M:1 coupling of the present invention. Accordingly, any circuit or any logic that counts timing events and produces an output in response thereto can be employed to carry out the function of each of the four counters.

Two types of counters are employed in a preferred embodiment of the present invention. One type is referred to as a "wrap-around counter," since it accumulates a count of events up to a predetermined maximum, and then rolls around to start the count over again. The other type of counter simply produces a control signal as a function of the accumulated count. In this embodiment, a SRC 176 and a SUC 178 are of the second type, while a SIC 180 and a RIC 182 are of the first type, i.e., the wrap-around type. SRC 176, SUC 178, and SIC 180 each receive an "increase" signal on a line 184 each time that the master configuration set transfers configuration parameters to a selected configuration register set. SRC 176 also receives a "decrease" signal on a line 188 from stage 174n of the pipeline, on a line 188. Once SRC 176 has reached a predefined maximum count, a Boolean value of a "full" signal changes from a zero to a one. This signal is applied to host CPU 162 via a line 186. SUC 178 also receives the increase signal on line 184 from the master configuration register set. In addition, it receives a "decrease" signal on a line 190 from stage 174a of the pipeline. If the count accumulated by SUC 178 is not equal to zero, it produces a Boolean "non-empty" signal on a line 192 that is applied to stage 174a (i.e., to Stage 1 of the pipeline).

SIC 180 receives the increase signal from master configuration register set 164 and produces an index signal on a line 194 ranging from 0 to M−1 because the output of the SIC resets to zero with the next increase signal, once the value of the index has reached a value (M−1), corresponding to the number of configuration register sets, which is equal to M.

RIC 182 responds to the increase signal from Stage 1, and produces a run index signal (which varies between 0 and M−1) that wraps around to zero once its value reaches its maximum value corresponding to the predefined number of configuration register sets, M. This run index value is supplied to stage 174a over a line 196 and is propagated to successive stages in the pipeline.

Logic Implemented by Counters

Figure 7:
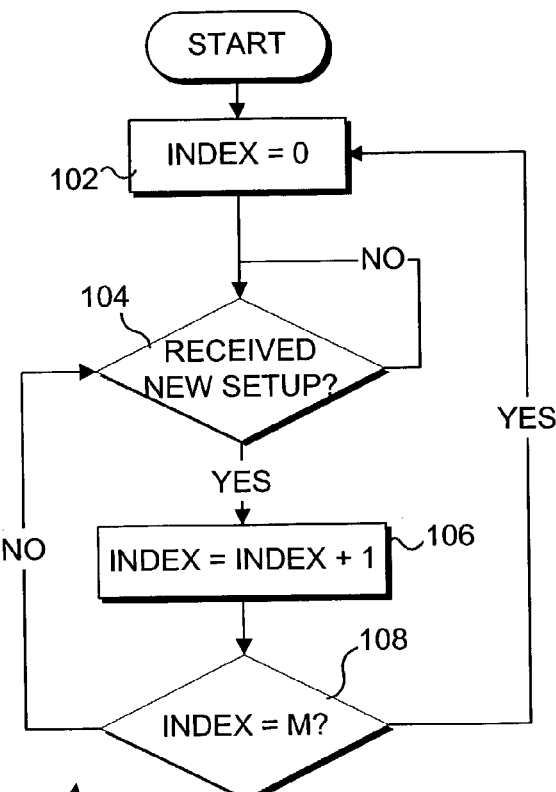
FIG. 7 is a flowchart showing the logic implemented by the setup-index counter (SIC)

Further details of the logic implemented by each of the counters are illustrated in FIGS. 7 through 10. FIG. 7 illustrates a flowchart 100 for the SIC. A step 102 initializes the value of the index count to zero. Next, a decision step 104 determines if a new setup of configuration parameters has been received by the master configuration register set and if so, the value of the index count is incremented by one in a step 106. If not, the logic simply loops back to wait until a new setup is received. Next, a decision step 108 determines if the index is equal to M. If not, the logic loops back to decision step 104. However, once the index has reached the maximum predefined value in decision step 108, the logic loops back to step 102 to reinitialize the index count to equal zero. The index value is output by the SIC before step 106, so that the value of the index signal ranges between 0 and M−1.

Figure 8:
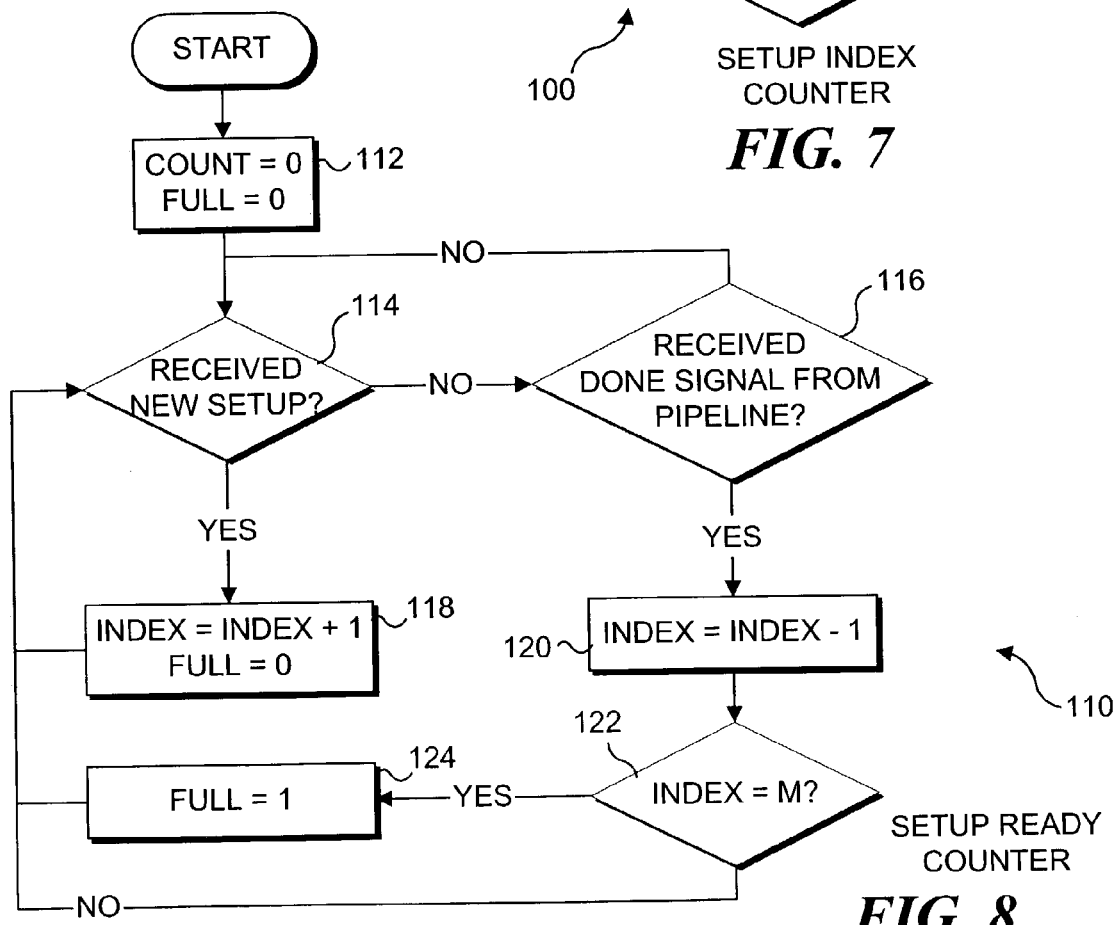
FIG. 8 is a flowchart illustrating the logic implemented by the setup-ready counter (SRC)

FIG. 8 illustrates a flowchart 110 for the logic implemented by the SRC. In a step 112, the count of this counter is initialized to zero and the Boolean variable full is set equal to zero. A decision step 114 determines if the master configuration register set has received a new setup, which is an event corresponding to the increase signal. If not, a decision step 116 determines if the counter has received a done signal from the last stage of the pipeline; the done signal is labeled "decrease" in FIG. 6. If not, the logic simply loops back to decision step 114 in FIG. 8. If the response to decision step 114 is affirmative, a step 118 increments the value of the index count by one and again insures that the value of full is set to equal zero. The logic then loops back to decision step 114. Similarly, in decision step 116, once the signal received from the last stage of the pipeline indicates that it is done, (the decrease signal), a step 120 decrements the index count by one. A decision step 122 determines if the index is equal to is maximum predefined value M and if not, simply loops back to decision step 114. However, once the index count has reached the predefined value M, a step 124 sets the output Boolean signal for full equal to one. The logic then again loops back to decision step 114.

Figure 9:
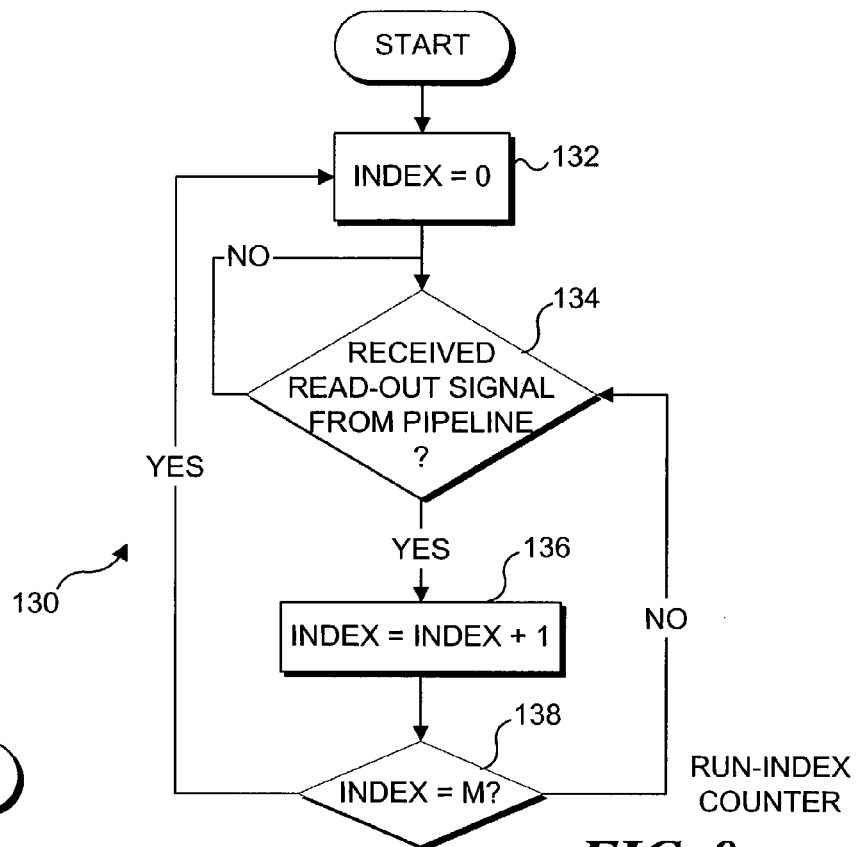
FIG. 9 is a flowchart showing the logic implemented by the run-index counter (RIC)

In FIG. 9, a flowchart 130 illustrates the logic for the RIC. A step 132 initializes the value of the run index count to zero. A decision step 134 then determines if the RIC has received a readout signal (i.e., an "increase" signal) from the first stage of the pipeline, and if not, simply loops until it does. Once the readout signal has been received, a step 136 increments the run index count by one. Finally, decision step 138 determines if the value of the run index count is equal to M. If not, the logic loops back to decision step 134. However, once the count has reached its maximum predefined value M, the logic loops back to step 132 to reset the run index count to equal zero.

Figure 10:
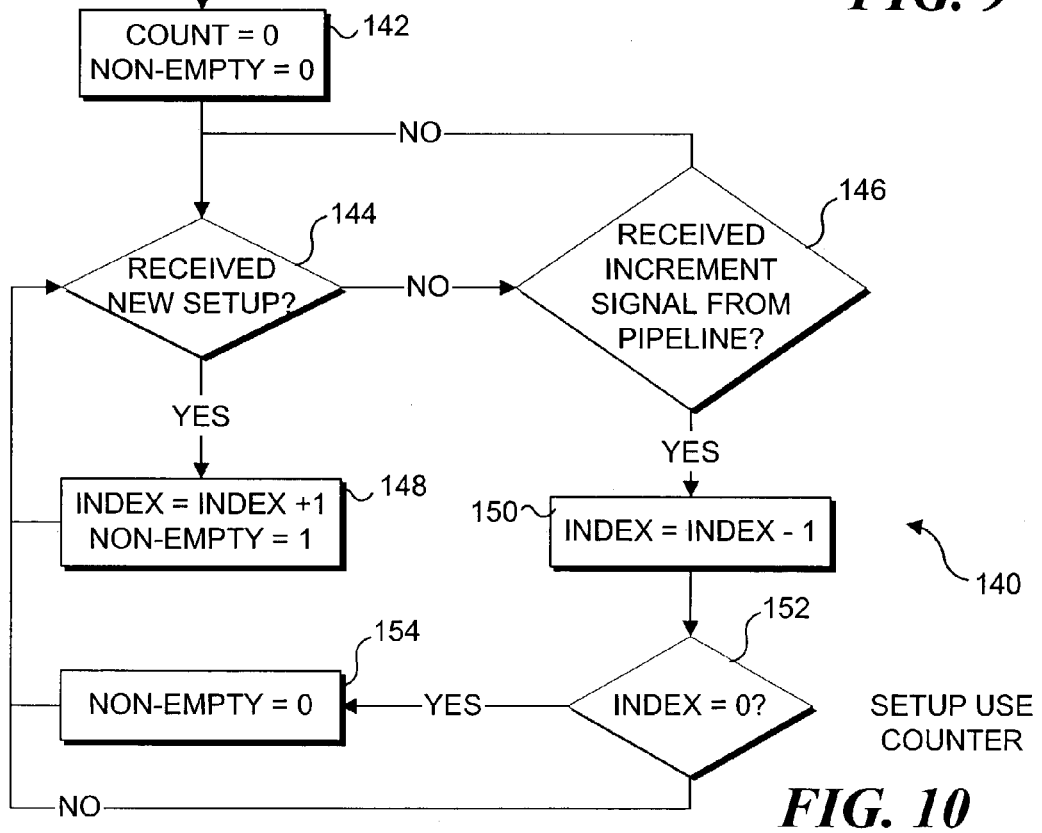
FIG. 10 is a flowchart showing the logic implemented by the setup use counter (SUC)

A flowchart 140 in FIG. 10 illustrates the steps implemented by the SUC. At a step 142, the value of count is initialized to zero and the non-empty Boolean signal is set equal to zero. A decision step 144 determines if a master configuration register set has been loaded with a new setup of configuration parameters. If so, a step 148 increments the index count and sets the Boolean variable non-empty equal to 1, before looping back to step 144. If not, the logic continues with a decision step 146, which determines if the SUC has received a "decrease" signal from the first stage of the pipeline. Once the decrease signal is received, a step 150 decrements the index count by one. If the signal is not received from the first stage of the pipeline, the logic simply loops back to decision step 144. Following step 150, a decision step 152 determines if the value of the index count is equal to zero. If so, a step 154 sets the Boolean variable non-empty equal to zero. After step 154, or if the index count is not equal to zero, the logic loops back to decision step 144.

Figure 11:
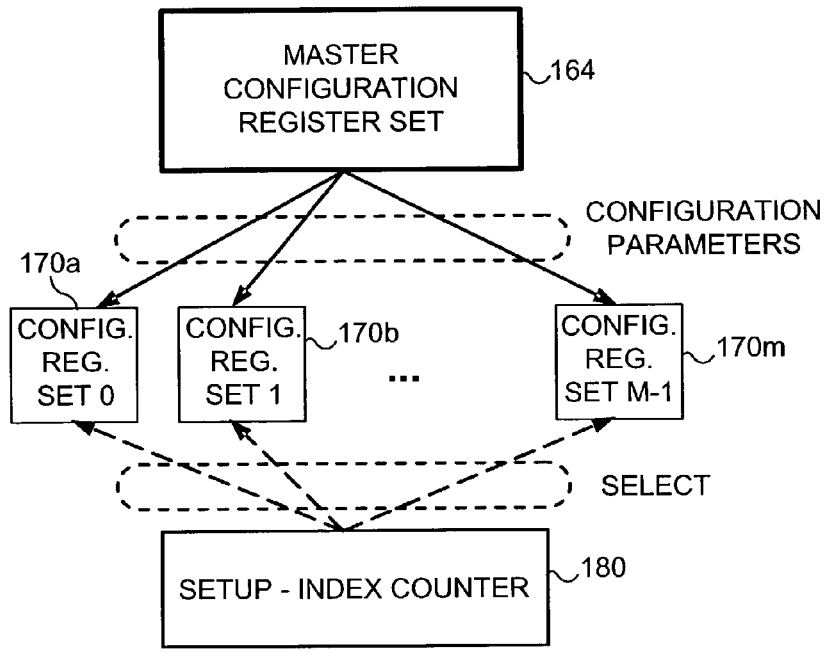
FIG. 11 is a functional diagram showing how the SICselects a configuration register set to receive the configuration parameters loaded into the master configuration register set.

FIG. 11 illustrates further details concerning the use of the index count signal produced by SIC 180 for determining which of the M configuration register sets is loaded with the configuration parameters temporarily stored in master configuration register set 164. As shown therein, the index count produced by SIC 180 is applied to select one of configuration register sets 170a through 170m to receive the configuration parameters from master configuration register set 164. Thus, depending on the value of the index count from SIC 180, a selected one of the configuration register sets will receive these configuration parameters.

Figure 12:
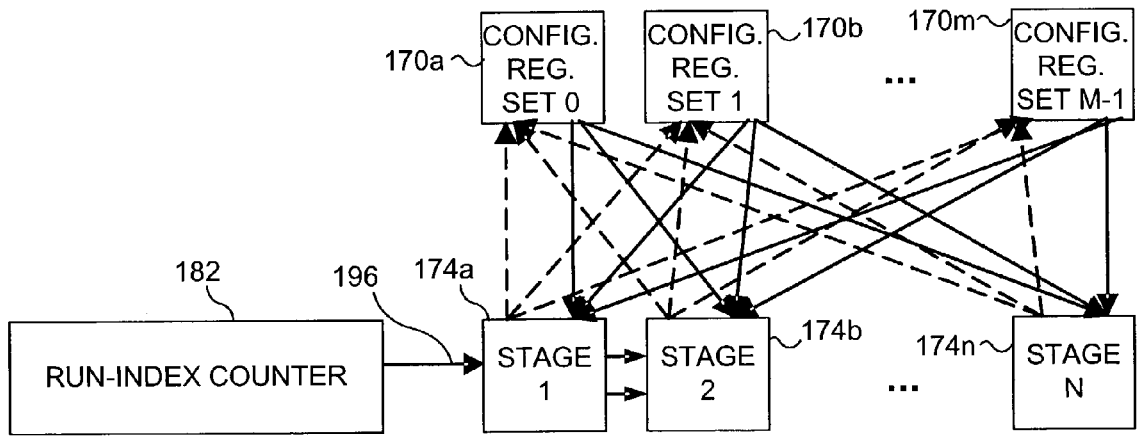
FIG. 12 is a function diagram showing how the RIC selects the configuration register set that will be used by each stage of the pipeline.

Similarly, as shown in FIG. 12, RIC 182 supplies the run index count that it accumulates to stages 174a through 174n to select one of configuration register sets 170a through 170m as a source of the configuration parameters stored therein for setting up a stage. Various approaches can be used for using the two different index counters shown in FIGS. 11 and 12 to select the appropriate recipient, or source, respectively. For example, a 1:M demultiplexer could be used in regard to responding to the index signal in FIG. 11, while in FIG. 12, an M:1 multiplexer array could be used to respond to the run index count of RIC 182. The complexity of an M:1 multiplexer array can be significantly reduced in real application of the present invention, because not all stages typically need to access register sets. In many cases, a stage can work with only the results from a previous stage. Also, if necessary, a stage that has access to the configuration register sets can identify a register that is required in a next stage and pass the configuration parameter in that register to the next stage. Furthermore, a stage typically needs to access only a few registers in a configuration register set, because each stage performs a specific task.

Figure 13:
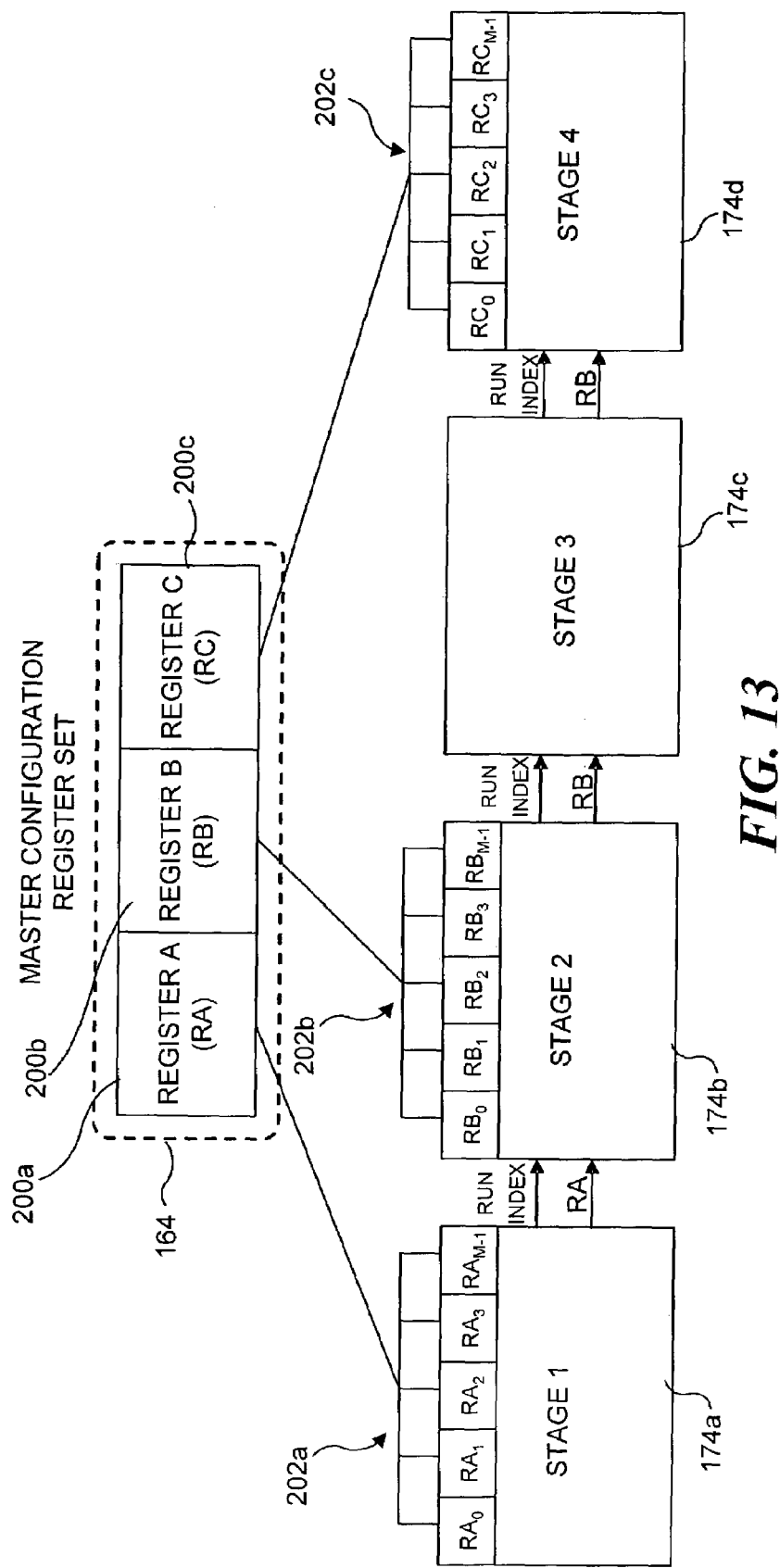
FIG. 13 is a functional diagram showing the relationship between registers in the master configuration register set and the transfer of configuration parameters to configuration registers accessed by the stages of the pipeline.
Figure 14:
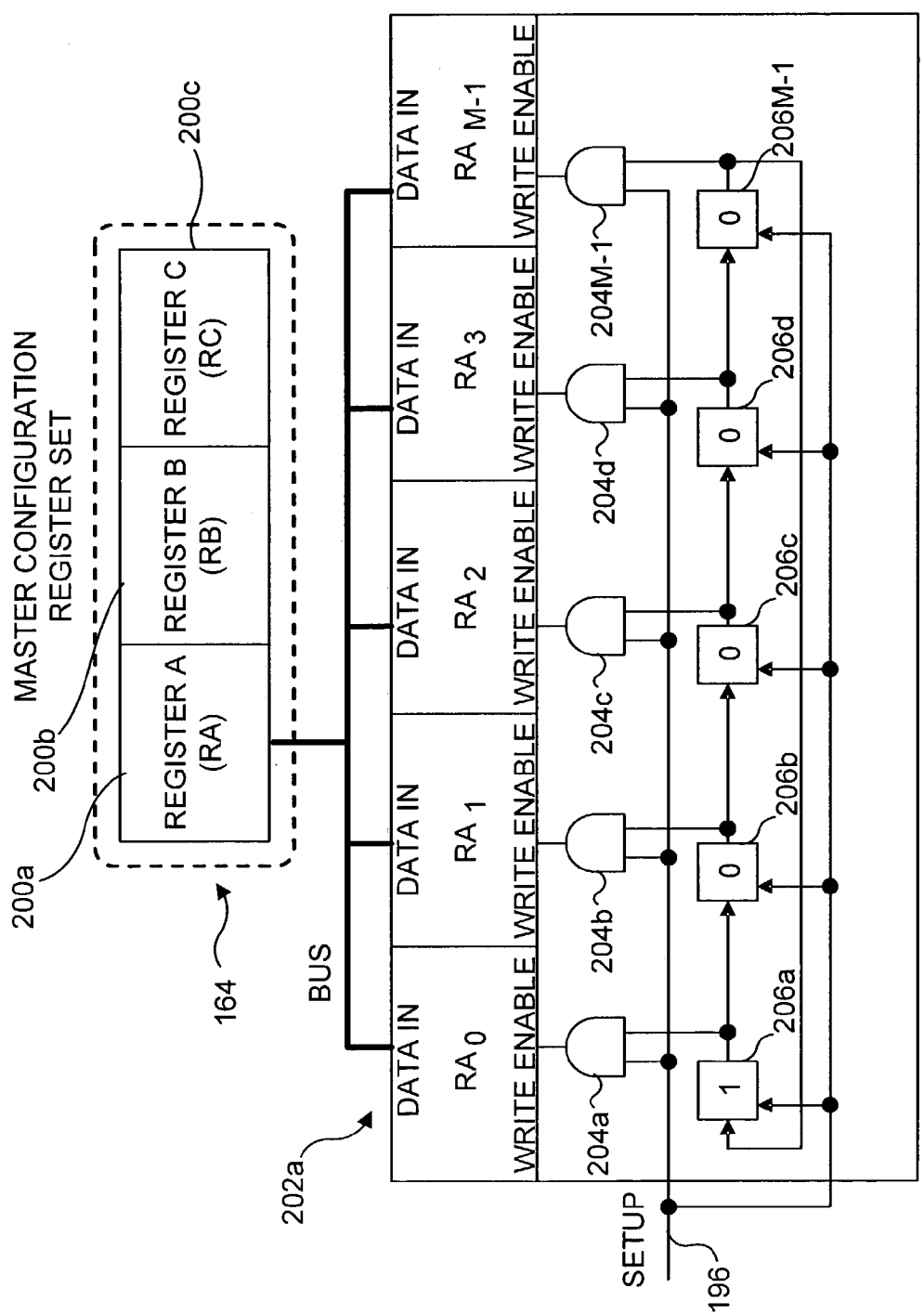
FIG. 14 is a schematic diagram showing how D flip-flops are used for controlling transfer of configuration parameters into the stages of the pipeline.

FIGS. 13 and 14 illustrate details that facilitate understanding how master configuration register set 164 is loaded with configuration parameters that are transferred subsequently to the configuration registers sets for use by stages 202a, 202b, and 202c of the pipeline. In the example shown in FIG. 13, master configuration register set 164 has three registers, 200a, 200b, and 200c, respectively corresponding to Register A (RA), Register B (RB), and Register C (RC). Further, in this example, it is assumed that the following register access requirements apply to the stages. Stage 1 requires configuration parameters from RA, Stage 2 requires configuration parameters from RB, Stage 3 does not require any configuration parameters, and Stage 4 requires configuration parameters from RB and RC. In this example, the configuration register sets are split and merged based on the requirements of each stage. For example, Stage 174a (Stage 1) includes M registers ($RA_0$-$RA_{M-1}$) which correspond to the contents of RA 200a. Since Stage 174b (Stage 2) also requires the configuration parameters from RA, they can be supplied from Stage 1. Accordingly, Stage 2 needs separately to be loaded with the configuration parameters from RB 200b. Similarly, Stage 174d (Stage 4) receives the configuration parameters from RC in M registers ($RC_0$-$RC_{M-1}$) and is also loaded with the configuration parameters from RB, which are received from Stage 2 and passed through Stage 3. Stage 3 does not require configuration parameters to be loaded. It will be apparent that any stage containing registers can access a required register based on the RIC that is passed from the previous stage, which is supplied by the RIC.

Alternative Embodiment

Figure 15:
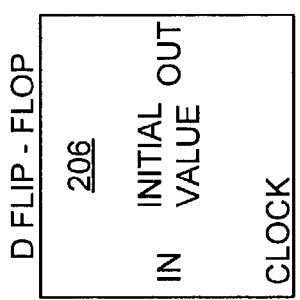
FIG. 15 is a schematic view of a D flip-flop as used in FIG. 14.

FIG. 14 illustrates an embodiment of the present invention, corresponding to the example of FIG. 13, that can be implemented without the need for using the SIC; also, a 1:M DEMUX array or its equivalent is not required. Instead, in this embodiment, the configuration register sets are selected for setup in a round-robin fashion, rather than in a random access manner. This alternative embodiment employs a set of AND gates 204a, 204b, 204c, 204d, . . . 204M–1 and a set of D flip-flops 206a, 206b, 206c, 206d, . . . 206M–1 that are sequentially connected. FIG. 15 shows further details of a D flip-flop used in this embodiment. An initial value of D flip-flop 206a, which is connected to register $RA_0$, has an output value of one, while all of the other D flip-flops in stage one have zero outputs. For each setup event, which is indicated by a signal from the host, the value of one is shifted to the next successive D flip-flop so that only one D flip-flop in the sequence has an output value of one at any given time. It is that D flip-flop that is used to select one of the M RA registers for setup. The configuration parameter in that selected register is then transferred from the master configuration register set into the selected register of the stage. This same approach is used for each stage in the pipeline, except that registers that have been loaded from a previous stage can be transferred into the successive stage so that they need not be transferred from the master configuration register set.

Timing Relationships

Figure 16:
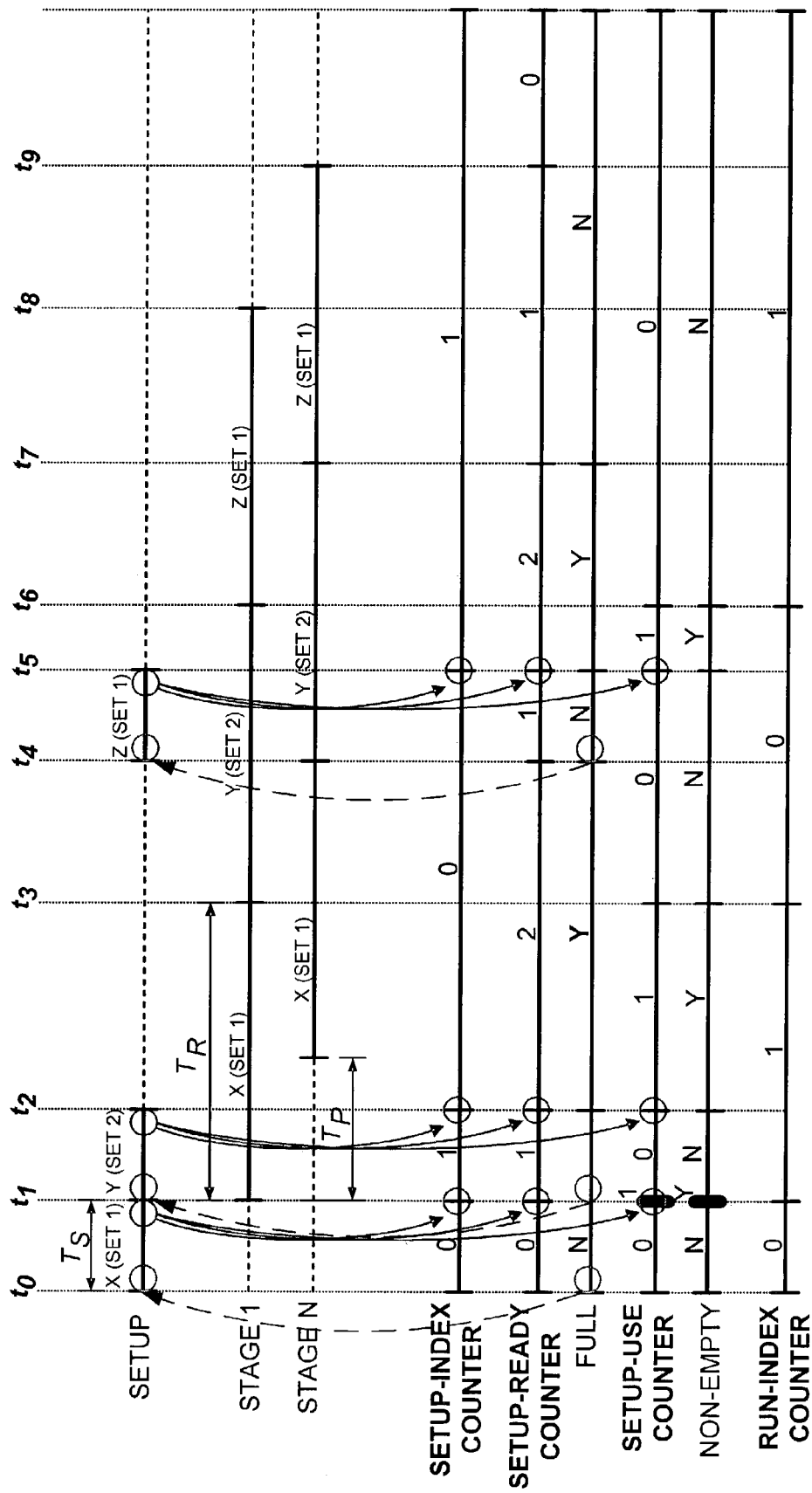
FIG. 16 is a timing diagram for host processor activities in regard to the counter values.

To assist in understanding how the four counter embodiment timing operates, FIG. 16 illustrates the host CPU activities and counter values at times to through $t_9$ in regard to setup, Stage 1, and Stage N. In this simple example, there are three runs or tasks including Tasks X, Y, and Z, and only two configuration register sets are used. At times $t_0$, $t_1$, and $t_4$, the SRC output indicates that the host CPU can setup a register set. From times $t_2$ through $t_4$, and $t_5$ through $t_7$, the SRC indicates that the host CPU must wait until a register set is available. Note that at time $t_1$, the SIC, SRC, and SUC are incremented so that at time $t_1$, the SUC briefly has a non-empty output. The count accumulated by the SIC changes from a zero to one at time $t_1$, and at $t_2$ changes back to zero until time $t_5$, when it changes again to one. The SRC accumulates a count of one at time $t_1$, a count of two at $t_2$, decrements to a count of one at $t_4$, increments to a count of two at time $t_5$, decrements to a count of one at time $t_7$, and decrements to a count of zero at time $t_9$. Only when the count value is equal to two is the Boolean variable full set to 1 (or yes). The RIC increments to one at time $t_1$, decrements to zero at time $t_3$, and increments again to one at time $t_6$.

Figure 17:
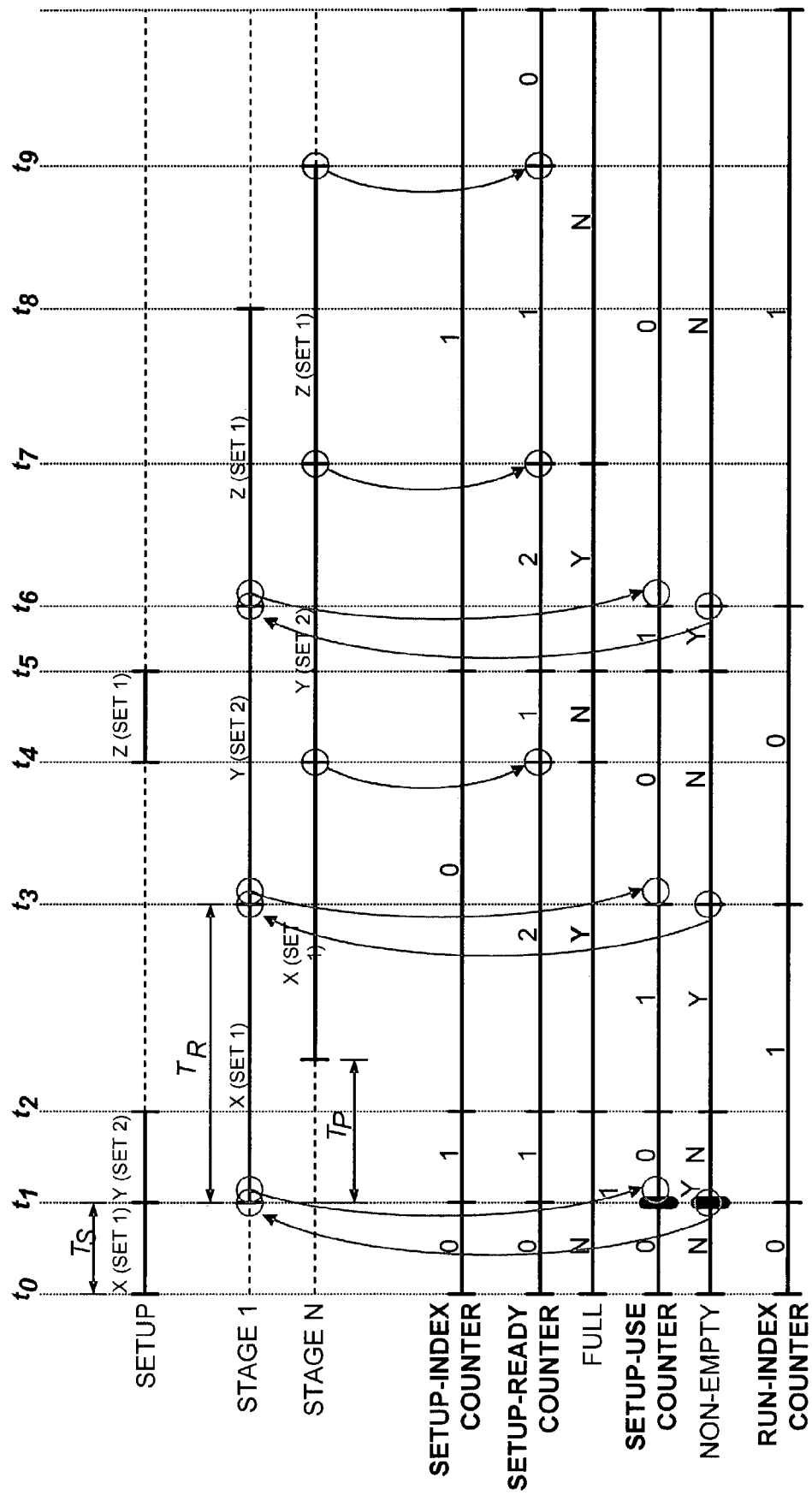
FIG. 17 is a timing diagram for pipeline activities in regard to the counter values.

FIG. 17 illustrates the relationship between pipeline activities and counter values for this same simple example. At times $t_1$, $t_3$, and $t_6$, SUC indicates that there is at least one register set ready for use. The pipeline reads out the registers set and decreases the SUC. At times $t_4$, $t_7$, and $t_9$, the last stage of the pipeline decreases the SUC, indicating that a register set is retired and ready for a new setup.

Figure 18:
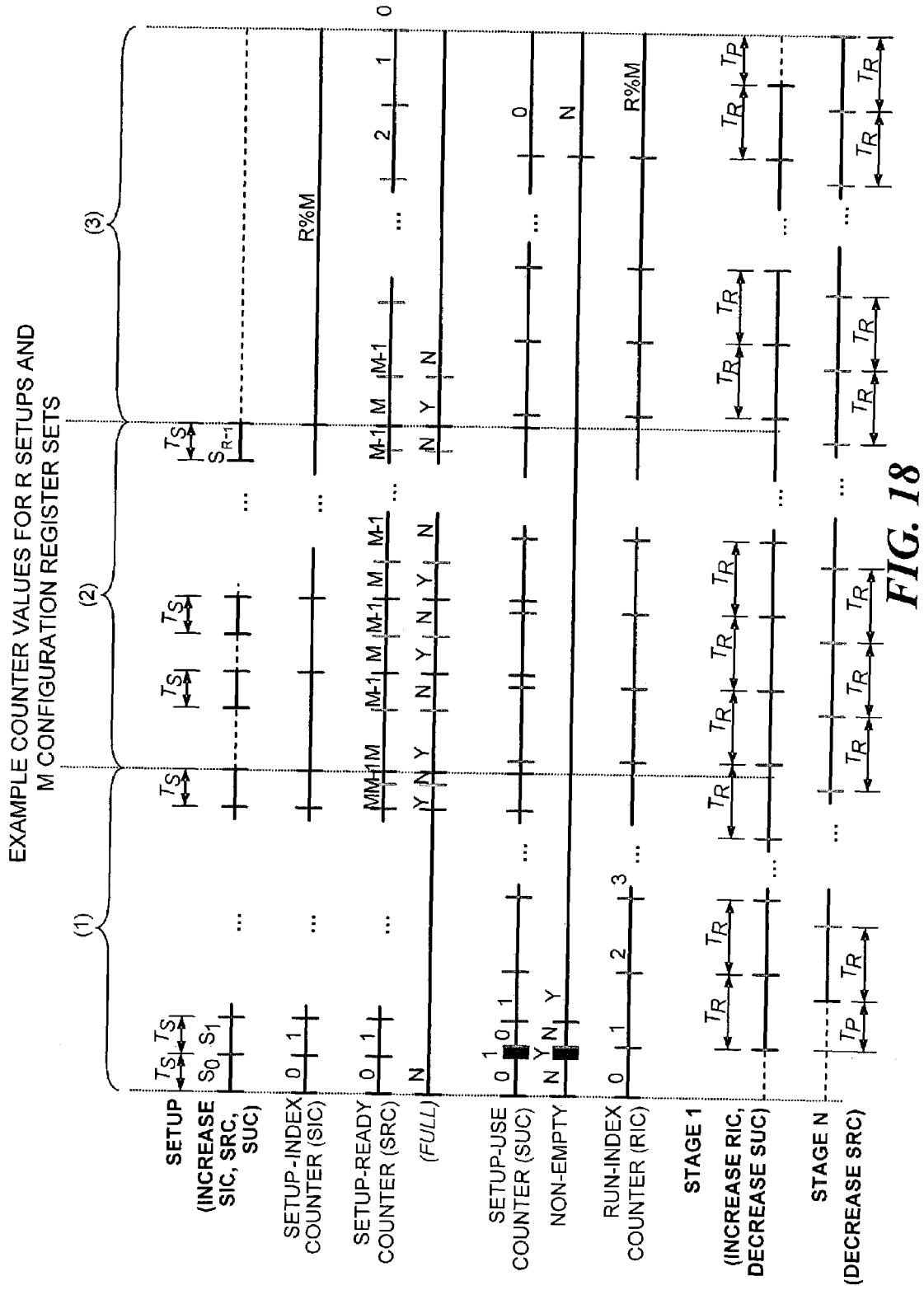
FIG. 18 illustrates the counter values for R configuration setups and M configuration register sets.

FIG. 18 illustrates the timing relationship between counter values for R setups and the more general case of M configuration register sets. Based upon the preceding, it should be apparent that the SIC is used to select a configuration register set for a setup; the SRC generates a full signal, indicating that no configuration register set is available for a setup; the RIC generates a run index count used by pipeline stages to access a particular configuration register set. The run index count is passed from the first stage to the last stage through each successive stage. The SUC generates a non-empty signal indicating that there is at least one configuration register set ready for use in the pipeline.

The value of each of these four counters at a given time t is described by the following:

$SIC(t) = NS(t) \% M$ where NS(t) is the number of setups done until t, M is the number of configuration register sets, and % is a remainder operator.

$SRC(t) = NS(t) - NRL(t)$ where NRL(t) is the number of runs completed at the last stage of the pipeline until t.

The full signal at t is generated as:

$FULL(t)$=true when $SRC(t)=M-1$, and false otherwise.

$RIC(t) = NRF(t) \% M$ where NRF(t) is the number of runs started at the first stage of the pipeline until t.

$SUC(t) = NS(t) - NRF(T)$

The non-empty signal (NEMT) at t is generated as:

$NEMT(t)$=true when $SUC(t)>0$, and false otherwise.

The preceding assumes that there are more setups than configuration register sets (R>M). If not, dynamic register set allocation is not required.

FIG. 18 illustrates three types of time regions. In the first time region, at least one configuration register set is ready for a setup, so that the host CPU can continuously make a setup with the master configuration register set. In the second time region, the host CPU must wait for a configuration register set to become available for a setup. Finally, in the third time period, the host CPU does not make any setup and the pipeline continues to execute until all setups are consumed. It will be understood that there are three kinds of actions that change the counter values. In the first, the host CPU makes a setup causing an increase in the counts of the SIC, the SRC, and the SUC. The second action occurs when the first pipeline stage retrieves an index from the SUC, causing the count of the SUC to decrease and the count of the RIC to increase. Finally, the third action occurs when the last pipeline stage finishes execution for a given setup, causing the count of the SRC to decrease.

Examples Illustrating Effectiveness of Present Invention

In this section, two exemplary cycle-accurate simulations that verify the effectiveness of the present invention in a graphics pipeline are discussed. The first example assumes texture filtering is not used and that sufficient memory bandwidth is provided for a simple analysis. In the second example, bilinear/trilinear texture filtering is employed, and only a limited memory bandwidth is available, to provide a more realistic evaluation. Since the present invention ensures a negligible setup delay by using a master configuration register set, and because overhead of the setup delay can be hidden (except for the first run), it is assumed that there is no setup delay time in these examples.

Figures 19, 20:
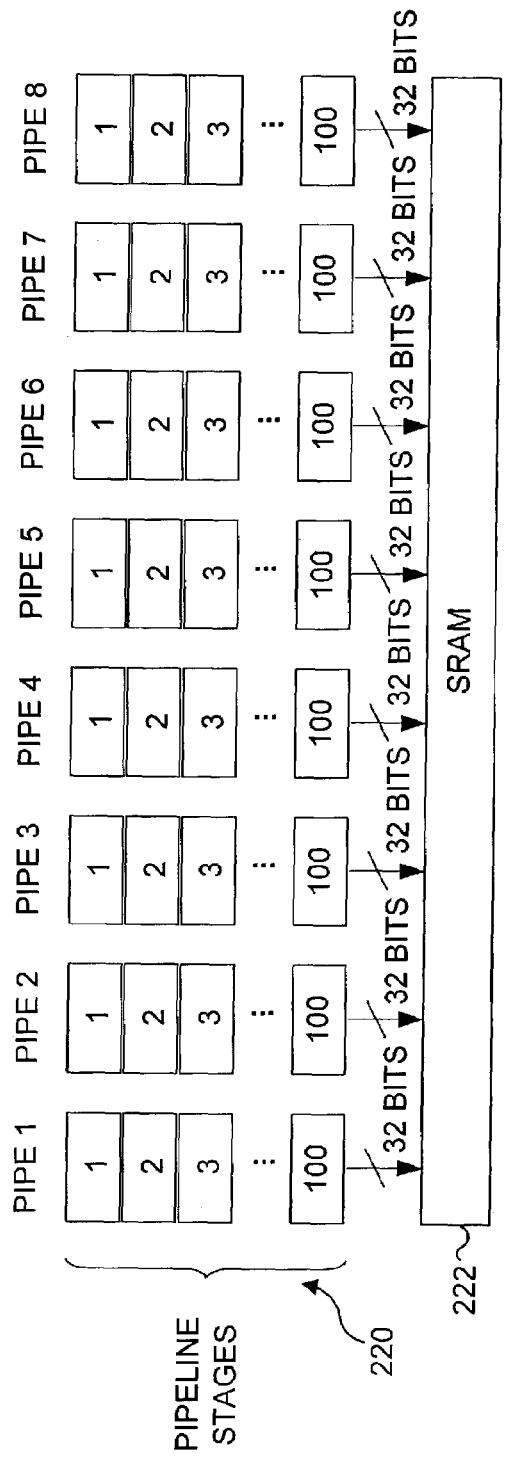
FIG. 19 is a schematic view of an exemplary graphics pipeline with 100 stages and 8 pipelines operating in parallel.
FIG. 20 is a table showing the total cycles for rendering various numbers of rectangles, both with and without pipeline delay.

FIG. 19 illustrates eight pipelines 220 that provide a peak throughput of eight pixels per cycle. Another case (not separately shown) employs only a single pipeline, rather than the eight shown in this Figure, and processes only one pixel per cycle. The single pipeline is otherwise identical. For either the case with one pipeline or the case with eight pipelines, there are 100 pipeline stages that produce an output stored in a static random access memory (SRAM) 222 with sufficient bandwidth for the throughput requirements. These pipelines can render rectangles as well as triangles, in 32-bit red, green, blue, and alpha (RGBA) format. In the following examples, rectangles are used to simplify the analysis.

In order to evaluate the overhead of the pipeline delay, various combinations of rectangles were rendered, as listed in the table shown in FIG. 20, all yielding 65,536 total pixels. Since a pipeline delay (100 cycles in these examples) was added to each run, the pipeline overhead becomes increasingly significant as the size of rectangles decreases.

In the case of only one pipeline, the total number of cycles for rendering one 256×256 pixel rectangle without pipeline delay (i.e., using the present invention) is 65,636, because this case includes 100 cycles of the pipeline delay and 65,536 cycles of the pipeline active time (due to the throughput of one pixel per cycle). In rendering 1024 8×8 rectangles, the total number of cycles without the present invention is 167,936, due to the 155.9% overhead of the pipeline delay. In the case of eight pipelines, without using the present invention, this overhead becomes very significant (1233.7%). However, by applying the present invention to the pipelines, the overhead can be completely eliminated except for the first run, so that the total cycles are only 8,292.

As discussed above, the number of configuration register sets required for the present invention is $$\left\lceil \frac{T_P}{T_A} \right\rceil + 1,$$

and the pipeline active time ($T_A$) depends on the size of the rectangles and the rendering throughput. To completely eliminate the pipeline delay in rendering 8×8 rectangles, the number of register sets required is 3

$$\left(\text{i.e., } \left\lceil \frac{100}{(8 \times 8)} \right\rceil + 1\right)$$

for the one pipeline case), and 14

$$\left(\text{i.e., } \left\lceil \frac{100}{\left(8 \times \frac{8}{8}\right)} \right\rceil + 1\right)$$

for the eight-pipeline case.

FIG. 21 is a graph illustrating the total number of cycles, with various numbers of configuration register sets, for the eight-pipeline case, using the present invention. Specifically, a line 230 indicates the results for one configuration register set; a line 232 indicates the results for two configuration register sets; a line 234 indicates the results for three configuration register sets; a line 236 indicates the results for five configuration register sets; a line 238 indicates the results for ten configuration register sets; and a line 240 indicates the results for 14 configuration register sets. This graph indicates that there is little overhead, even with one set of configuration registers, when rectangles of 64×64 pixels or greater are rendered, whereas more than 10 configuration register sets are required for rendering rectangles having a size of 8×8 pixels or less.

In an actual graphics pipeline, the number of configuration register sets required to eliminate the pipeline delay can be different from that indicated in the previous examples, due to the dynamic behavior of the pipeline, e.g., pipeline stalls caused by memory accesses and other resource conflicts. Therefore, a 256-bit graphics pipeline with 100 pipeline stages 248, running at 300 MHz with a 64-bit, 150-MHz DDR SDRAM 250, was also tested, as indicated in the example of FIG. 22.

As the table of FIG. 23 shows, peak throughput (in pixels/cycle) of the pipeline in FIG. 22 in accord with the present invention, can vary due to the different processing requirements of texture filtering methods that are employed. In case of no filtering, the 256-bit pipeline can produce eight 32-bit RGBA pixels per cycle (assuming sufficient memory bandwidth is provided), whereas the peak throughput is substantially less with bilinear and trilinear filtering. For example, in trilinear filtering, the peak throughput is only one 32-bit RGBA pixel per cycle, since two sets of 2×2 32-bit RGBA texture data (256 bits) are needed for a single output pixel.

Figure 24:
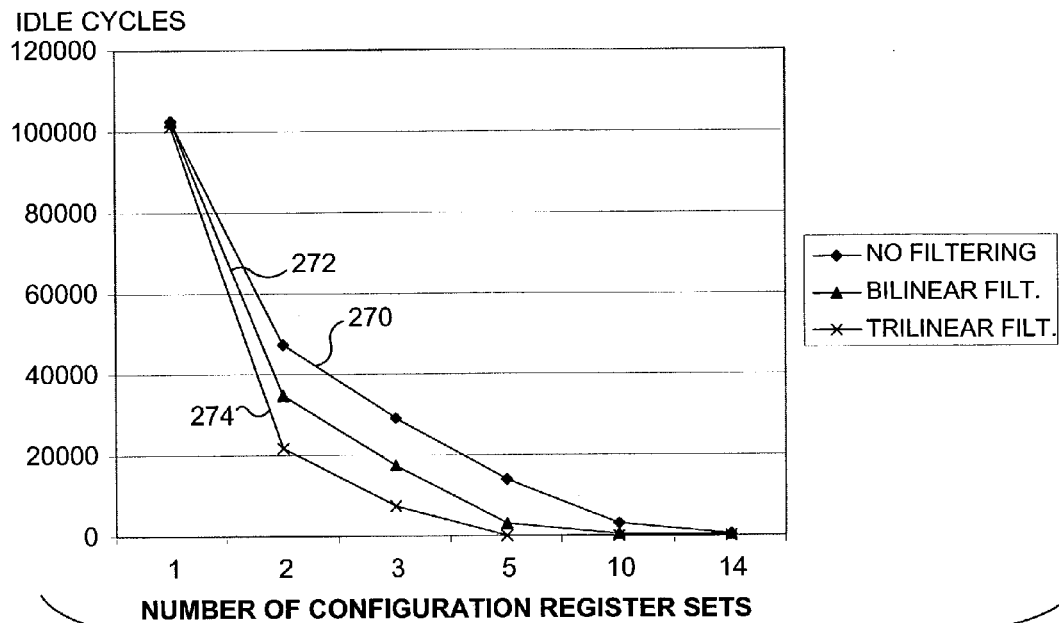
FIG. 24 is a chart of the number of idle cycles for different numbers of configuration register sets, for each of the different filtering methods of FIG. 23.

The graph of FIG. 24 shows the idle cycles with various numbers of configuration register sets using the present invention, for no filtering (a line 270), for bilinear filtering (a line 272), and for trilinear filtering (a line 274). Note that all filtering functions belong to the condition where the pipeline active time is less than the pipeline delay time ($T_A < T_P$), since the idle cycles decrease with multiple configuration register sets. Two sets of configuration register sets would be sufficient, if the size of rectangles is 64×64 pixels or greater. Filtering with higher complexity leads to longer pipeline active time, due to an increased memory access requirement; thus, the number of required register sets is smaller for a given number of idle cycles.

Figure 25:
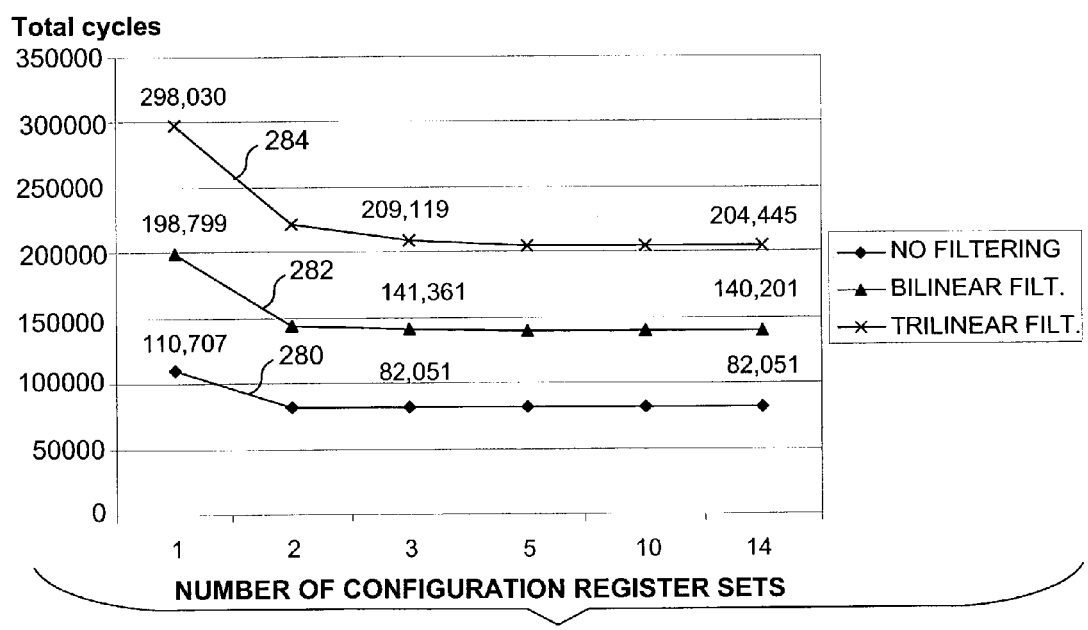
FIG. 25 is a chart of the number of total cycles for different numbers of configuration register sets, for each of the different filtering methods of FIG. 23.

FIG. 25 shows the performance improvement (in terms of total cycles) using the present invention, with various numbers of configuration register sets, in rendering 1024 8×8 pixel rectangles, for no filtering (a line 280), for bilinear filtering (a line 282), and for trilinear filtering (a line 284). In the best case, the total number of cycles can be reduced by the number of idle cycles. However, the total cycle improvement achieved is lower than expected, due to additional pipeline stalls caused by resource conflicts (e.g., more page misses in SDRAM accesses) when two consecutive runs are overlapped. Overall, the performance improved using the present invention, by 29 percent and 30 percent in bilinear and trilinear texture mapping, respectively, with three sets of configuration registers. The improvements with more register sets using the present invention are marginal in this example, e.g., 29 percent and 31 percent in bilinear and trilinear texture mapping with 14 sets of configuration registers.

CONCLUSION

The present invention can substantially reduce both setup and pipeline delays in deep-pipelined architectures. There are several advantages over the existing approaches of the prior art discussed above. First, setup or pipeline delay in consecutive runs is eliminated (except for the first run). Second, different configuration register sets are dynamically allocated to the host CPU and to the pipeline stages for setups and pipeline runs by four (or three) counters or equivalent elements. The host CPU can simply start a setup when the full signal from the SRC is not enabled. Third, the use of a master configuration register set can reduce the overhead of the setup time, particularly, if some of the previous configuration parameters already transferred to the stages can be used for the next run. Less setup time is highly desired, since the setup time can be an overhead if it is longer than either the pipeline active time or the pipeline delay. Since high-throughput, deep-pipelined architectures can result in more idle cycles, the present invention should be beneficial in future deep-pipelined architectures that require frequent setups.

Although the present invention has been described in connection with the preferred form of practicing it and modification thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A pipeline system for processing tasks, comprising:
   (a) a host that controls the processing of tasks and supplies configuration parameters used for processing the tasks;
   (b) a plurality of configuration register sets in which configuration parameters are selectively loaded by the host;

(c) a plurality of stages that employ configuration parameters from the configuration register sets to execute the tasks;

(d) a plurality of control signal sources that are separate and distinct from the host, and which track timing events in the pipeline system to produce a plurality of control signals that dynamically control access to the plurality of configuration register sets by both the host and the plurality of stages, so that the configuration registers are setup by the host with the configuration parameters in order to reduce occurrences of setup delays between tasks, and to eliminate a pipeline delay or to reduce a pipeline delay or to both eliminate and reduce a pipeline delay between tasks such that the pipeline delay is substantially incurred prior to processing the initial task in each stage after the initial stage, wherein the pipeline delay is idle time caused by a stage waiting for the output of a different stage to be completed, where such delays would delay processing of the tasks, and so that the processing of the tasks overlap within the plurality of stages, said reduction in setup delay and pipeline delay and said overlapping of the processing of the tasks together resulting in a decrease in a time required to process the tasks; and (e) at least one control signal source selected from the group of control signal sources consisting of:
  (i) a setup-ready control signal source that tracks an increment signal from the host and a decrement signal from the plurality of stages to determine when to produce a full control signal, said full control signal being supplied to the host to indicate that no configuration register set is available for a setup;
  (ii) a setup-use control signal source that tracks an increment signal from the host and a decrement signal from the plurality of stages to determine when to produce a non-empty control signal, said non-empty control signal being supplied to the plurality of stages to indicate that a configuration register set is ready for a run;
  (iii) a setup-index control signal source that tracks an increment signal from the host to produce an index control signal that indicates a specific configuration register set to receive the configuration parameters from the host, and wherein said index control signal rolls over after indicating a last of the plurality of configuration register sets, to next indicate a first of the configuration register sets to receive the configuration parameters from the host after receiving another increment signal; and
  (iv) a run-index control signal source that tracks an increment signal from the plurality of stages to produce a run-index control signal that indicates a specific configuration register set to provide the configuration parameters to one of the plurality of stages, and wherein said run-index control signal rolls over after indicating a last of the plurality of configuration register sets, to next indicate a first of the configuration register sets to provide the configuration parameters after receiving another increment signal.

2. The pipeline system of claim 1, further comprising a master configuration register set disposed between the host and the plurality of configuration register sets, said host loading configuration parameters into the master configuration register set for transfer into a selected one of the plurality of configuration register sets in response to a control signal from the plurality of control signal sources.

3. A deep-pipelined architecture in which an overhead of both setup and pipeline delays are substantially reduced while processing tasks, each task comprising subtasks into which the task is divided, comprising:

(a) a host that executes machine instructions to control pipeline processing of the subtasks comprising a task during a run;

(b) a plurality of stages that are sequentially coupled together to sequentially process the subtasks comprising each task;

(c) a plurality of configuration register sets that store configuration parameters used in the processing of the subtasks by the plurality of stages;

(d) a master configuration register set coupled between the host and the plurality of configuration register sets, said master configuration register set being loaded with configuration parameters by the host, for transfer to a selected configuration register set;

(e) a plurality of accumulators that are coupled to the host through the master configuration register set, and also to the plurality of configuration register sets and the plurality of stages, said plurality of accumulators responding to signals from the host and the plurality of stages, to determine a plurality of indices that dynamically control timing for access to the plurality of configuration register sets by the host and the plurality of stages, sources for the signals from the plurality of stages being separate and distinct from the host; and (f) at least one counter selected from the group of counters consisting of:
  (i) a setup-ready counter that accumulates counts in response to an increment signal from the host and decrements counts in response to a decrement signal from a last stage of the plurality of stages, said setup-ready counter producing a full signal that is supplied to the host to indicate that the plurality of configuration register sets have been loaded with the configuration parameters;
  (ii) a setup-use counter that accumulates counts in response to an increment signal from the host and decrements counts in response to a decrement signal from a first stage of the plurality of stages, said setup-use counter producing a non-empty signal that is supplied to the first stage to indicate that a configuration register set is ready for a run;
  (iii) a setup-index counter that wraps around, and which accumulates counts in response to an increment signal from the host to produce an index signal supplied to the plurality of configuration register sets, said index signal indicating a specific configuration register set to be loaded with the configuration parameters from the master configuration register set; and
  (iv) a run-index counter of a wrap-around type that accumulates counts in response to an increment signal from a first stage of the plurality of stages to produce a run-index signal supplied to the plurality of stages, said run-index signal indicating a specific configuration register set that is to provide the configuration parameters for a stage that is processing a subtask and requires the configuration parameters from one of the configuration register sets;

wherein said plurality of indices are employed to determine:
  (i) when the host loads the configuration parameters into the master configuration register set;

(ii) which of the plurality of configuration register sets is selected to receive the configuration parameters from the master configuration register set;

(iii) when the configuration parameters in the master configuration register set are transferred into a selected one of the plurality of configuration register sets; and (iv) when the configuration parameters in selected configuration register sets are loaded into the plurality of stages, so as to decrease a time required to process the tasks by processing the tasks without incurring setup delays between all of the tasks, and processing the tasks so as to eliminate or reduce or to both eliminate and reduce pipeline delays between tasks by causing the pipeline delay to be substantially incurred prior to processing the initial task in each stage after the initial stage, wherein the pipeline delay is idle time caused by a stage waiting for the output of a different stage to be completed.

4. The deep-pipelined architecture of claim 3, wherein there are a total of M configuration register sets, and wherein the index signal produced by the setup-index counter selectively actively couples one of the M configuration register sets to the master configuration register for transfer of the configuration parameters loaded in the master configuration register set into said one of the M configuration register sets that has been selected.

5. The deep-pipelined architecture of claim 3, wherein there are a total of M configuration register sets, and wherein the run-index signal produced by the run-index counter selectively actively couples a stage to one of the M configuration register sets indicated by the run-index signal to enable the stage to use the configuration parameters from said one of the M configuration register sets.

6. The deep-pipelined architecture of claim 3, wherein, to completely eliminate the overhead, the plurality of configuration register sets includes at least $$\left\lceil \frac{T_P}{T_A} \right\rceil + 1$$

configuration register sets, and wherein, to only substantially reduce the overhead, but not eliminate the overhead, the plurality of configuration register sets includes fewer than $\lceil T_P/T_A \rceil + 1$ configuration register sets, where $T_P$ is equal to a pipeline delay and $T_A$ is equal to a pipeline active time, for the deep-pipelined architecture.

7. The deep-pipelined architecture of claim 3, wherein a plurality of runs overlap within the plurality of stages.

8. A method for substantially reducing an overhead of both a setup time and a pipeline delay time for processing tasks in a deep-pipelined architecture, comprising the steps of:

(a) selectively transferring configuration parameters into each of a plurality of configuration register sets from a host, said configuration parameters being used to process the tasks;

(b) selectively employing the configuration parameters from the plurality of configuration register sets to execute the tasks with a plurality of stages; and (c) tracking timing events in the pipeline system to produce control signals for dynamically controlling access of the plurality of configuration register sets by both the host and the plurality of stages, so that the configuration registers are setup with the configuration parameters by the host in order to reduce occurrences of setup delays between tasks and to eliminate or to reduce or to both eliminate and reduce a pipeline delay between tasks by causing the pipeline delay to be substantially incurred prior to processing the initial task in each stage after the initial stage, wherein the pipeline delay is idle time caused by a stage waiting for the output of a different stage to be completed, where such delays would delay processing of the tasks and so that the processing of the tasks overlap within the plurality of stages, said reduction in the setup delay and the pipeline delay and said overlapping of the processing of the tasks together resulting in a decrease in a time required to process the tasks, sources of the control signals being separate and distinct from the host, the step of tracking timing events including at least one step selected from the group of steps consisting of:

(i) responding to an increment signal from the host and a decrement signal from the plurality of stages to produce a full control signal, said full control signal indicating that no configuration register set is available for a setup;

(ii) responding to an increment signal from the host and a decrement signal from the plurality of stages to produce a non-empty control signal, said non-empty control signal indicating that a configuration register set is ready for a run;

(iii) responding to an increment signal from the host to produce an index control signal that is used to select a specific configuration register set to which the host transfers the configuration parameters; and (iv) responding to an increment signal from the plurality of stages to produce a run-index control signal that is used to select specific configuration register sets from which the plurality of stages are provided the configuration parameters to be used when executing the tasks.

9. The method of claim 8, wherein the step of selectively transferring configuration parameters comprises the step of loading configuration parameters for one configuration register set into a temporary storage, for transfer to a selected one of the plurality of configuration register sets.

10. The method of claim 8, wherein the step of selectively employing the configuration parameters comprises the step of responding to a control signal that indicates specific configuration register sets from which the plurality of stages should access the configuration parameters to execute the tasks.

11. A memory medium having machine instructions stored thereon for carrying out the steps of claim 8.

* * * * *